(12) United States Patent
Geilich et al.

(10) Patent No.: US 8,655,590 B2
(45) Date of Patent: Feb. 18, 2014

(54) MAP DATABASE HAVING VECTORS FOR DETERMINING DESTINATIONS, AND VECTOR DETERMINATION METHOD

(75) Inventors: Michael Geilich, Hanover, NH (US); Duane Snell, Plymouth, NH (US)

(73) Assignee: TomTom North America, Inc., Lebanon, NH (US)

( * ) Notice: Subject to any disclaimer, the term of this patent is extended or adjusted under 35 U.S.C. 154(b) by 256 days.

(21) Appl. No.: 12/737,021

(22) PCT Filed: Dec. 10, 2008

(86) PCT No.: PCT/US2008/013544
§ 371 (c)(1),
(2), (4) Date: Feb. 8, 2011

(87) PCT Pub. No.: WO2010/068187
PCT Pub. Date: Jun. 17, 2010

(65) Prior Publication Data
US 2011/0160995 A1    Jun. 30, 2011

(51) Int. Cl.
*G08G 1/123* (2006.01)
(52) U.S. Cl.
USPC ................................ 701/532; 340/995.18
(58) Field of Classification Search
USPC ........... 701/532, 454; 340/990, 995.1, 995.18
See application file for complete search history.

(56) References Cited

U.S. PATENT DOCUMENTS

| 6,101,496 | A | 8/2000 | Esposito |
| 2004/0138817 | A1 | 7/2004 | Zoken et al. |
| 2007/0185649 | A1 | 8/2007 | Geilich |
| 2007/0296630 | A1 | 12/2007 | Schwerin |
| 2008/0040024 | A1* | 2/2008 | Silva .............................. 701/200 |
| 2008/0140311 | A1 | 6/2008 | Searight et al. |
| 2008/0243374 | A1 | 10/2008 | Hatazawa |

FOREIGN PATENT DOCUMENTS

| DE | 3820129 | 12/1989 |
| EP | 1933239 | 6/2008 |
| GB | 2213297 | 8/1989 |
| WO | WO 2008002391 | 1/2008 |

OTHER PUBLICATIONS

International Search Report.

* cited by examiner

*Primary Examiner* — Thomas Black
*Assistant Examiner* — Luke Huynh

(57) ABSTRACT

A method, database, memory computer readable medium and navigation device are disclosed. In at least one embodiment, the method includes projecting a plurality of known address points onto an address segment vector of a source map database, to create projection points; interpolating locations for addresses of the address points, to create corresponding interpolation points; and segmenting the address segment vector into a plurality of address sub-segment vectors, upon a distance between a projection point and a corresponding interpolation point exceeding a threshold distance. Embodiments include a memory including a digital map application database storing the address sub-segment vectors of the method, at least one of in place of and in addition to corresponding address segment vectors, upon an address segment vector being segmented; a navigation device including the memory; a digital map application database including a plurality of address segment vectors and a plurality of address sub-segment vectors and a computer readable medium including the digital map application database.

36 Claims, 15 Drawing Sheets

MAP DATABASE HAVING VECTORS FOR DETERMINING DESTINATIONS, AND VECTOR DETERMINATION METHOD

FIELD

Embodiments of the present invention generally relate to map databases and map database formation methods having information for determining locations of specific addresses and, more particularly, to map databases having a data structure used for accurately determining the positions or locations of places desired by a user.

BACKGROUND

In recent years, consumers have been provided with a variety of devices and systems to enable them to locate places on a digital map. The term "place" is a general term used throughout the description of embodiments of this invention. The term "place" includes street addresses, buildings located at street addresses such as businesses and landmarks, and facilities located at a number of street addresses such as shopping malls and business parks. The variety of devices and systems used by consumers are in the form of in-vehicle navigation systems that enable drivers to navigate over streets and roads; hand-held devices such as personal digital assistants ("PDAs"), personal navigation devices (PNDs), and cell phones or other types of mobile devices that can do the same; desktop applications, and Internet applications in which users can generate maps showing desired places. The common aspect in all of these and other types of devices and systems is a map database of geographic features, vectors and attributes, and software to access, manipulate and navigate the map database in response to user inputs.

Essentially, in all of these devices and systems a user can enter a desired place and the returned result will be the location of that place. Typically, users will enter the name of a business, such as a restaurant for example, or a destination landmark, such as the Golden Gate Bridge for example, or a street address, etc. The device/system then determines and returns the location of the requested place. The location may be shown on a map display, or may be used to calculate and display driving directions to the location in a known manner, or used in other ways.

Map databases provide information about locations of houses and buildings on streets. Map database developers include address data over a given address range for a given street or street segment (address segment) in map databases. The address range will include a group of building or house numbers corresponding to a given side of the street segment, with starting house numbers and positions, ending house numbers and positions, and optionally some intermediate house numbers and positions.

To locate a desired place in response to a user input or selection of a desired destination, the software of the device or system first determined the street address of the place, then located the street segment that has an address range containing the desired selected or input address, and then performed interpolation within the address range to estimate the location of the place. However, the interpolation algorithm would often have trouble accounting for variations in the real world distribution of buildings or house numbers along a given street block. For example, there may have been a park at the beginning or in the middle of the block, houses may have been distributed along the block non-uniformly, and/or buildings at the ends of address ranges may not have been located exactly at street intersections.

Ideally, building and/or house numbers at the end of an address range will represent real building addresses, thus reducing error in interpolating intermediate house numbers. However, this is not always the case. Some map databases are modeled with address ranges using potential building or house numbers at the end points, and this exacerbates the problem of accurately interpolating intermediate building or house numbers. For example, a map database may model address ranges using potential building or house numbers as assigned by the U.S. Postal Service. Further, as an example, in downtown New York City, where streets are broken up into blocks of 100 address numbers, building or house numbers along a block side seldom represent the entire address range and often fall short of completing the range at one end or the other.

Interpolation using the above methods may have errors of fifty percent or more of the length of the stored street segments or ranges. These interpolation errors can translate into tens or hundreds of meters of errors, for example, possibly making a desired place out of a user's range of sight for a user who has navigated to the interpolated location of the desired destination.

Known digital map databases, as shown in FIG. 1, include address segments or address segment sides commonly represented as address segment vectors in the known digital map databases. Such address segments or address segment sides, commonly represented as address segment vectors, are typically stored, in memories containing the map databases, as features with start and end points, connected by a line (possibly shaped as shown in FIG. 1 for example using shape points SP which will be discussed hereafter). Such address segment vectors typically represent one side of the address segment, an address segment side (wherein address segment is understood to mean any travel route including but not limited to roads, streets, highways, etc., identifiable by name and including known addresses).

As an example, a start point such as #2 of FIG. 1 and an end point such as #98 of FIG. 1 typically represent starting and ending house or building numbers of an address segment or side of a street. An address range is used to represent all of the addresses for an address segment or address segment side and typically runs from the starting house number to the ending house number (for example #2 to #98 in FIG. 1), possibly with some parity (only including even numbers for one side of the address segment and only including odd numbers for the other side of the address segment, or including both if both sides of an address segment are represented).

An address range for an address segment or address segment side is typically stored with the address segment vector in the digital map database and can be used, in a known manner, in navigation and other types of map techniques for locating position or travel destinations in a known manner. Typically, address segment vectors are stored in the digital map database along with attribute information including but not limited to, for example, speed limits on the address segment, any indication of turn restrictions or one way only access, census codes, zip codes, street names, etc.

Typically, the locations of intermediate house numbers (between the start and end points of the address range) are calculated using linear interpolation within the address range in a known manner. As shown in FIG. 2 for example, house #50 will typically be determined by a linear interpolation to be midway along the shape of the address segment of FIG. 2, between address #2 and address #98. Such interpolation is commonly used in geocoding and navigation applications which utilize digital map databases to determine locations, travel destinations, places, etc.

There are several problems with use of linear interpolation methodology that can lead to interpolation error. First, some digital map databases do not use real building numbers for the start and end points of an address segment. Instead, they use postal potential addresses (the addresses reserved for that address segment by the U.S. Postal Service) in order to accommodate locating buildings that may be constructed after the digital map database is built or for ease of postal delivery. For example, in the potential postal range on a segment is #2 to #98 as shown in FIGS. 1 and 2 for example, linear interpolation following the curvature of the road will locate address #50 near the midpoint of the segment. However, if the actual end point addresses are #2 and #60 as shown in FIG. 3 for example, instead of correctly interpolating the address at point #50b in FIG. 3, linear interpolation will be used using the postal potential address range of #2 to #98 and will locate the address at point #50a as shown in FIG. 3, following the curvature of the segment. Thus, an error will occur in the navigation and/or geocoding applications.

Further, as shown in FIG. 4, in reality addresses are not typically distributed linearly on a segment. FIG. 4 shows an example photo including a large park or vacant lot 140 in the middle of the block, which may cause address numbers to be unevenly distributed along an address segment.

Some digital map databases have been constructed using actual address numbers as start and end points of segments, instead of postal potentials. While this may improve on interpolation of intermediate points, linear interpolation can still show large errors when addresses are not distributed uniformly along a segment, for example, when there is a park, parking lot, or apartment building on the block. In addition, non-linear interpolation methods could be used, such as logarithmic interpolations which assume that physical addresses are concentrated at one end of address segments. However, this method also fails when addresses are not readily distributed according to the algorithm used for intermediate point interpolation.

Still other digital map databases have been constructed with some or all individual (point) addresses added to the address segments according to their actual location. An example of this is discussed in U.S. patent application Ser. No. 11/351,156 filed on Feb. 8, 2006, entitled "MAP DATABASE HAVING ADDRESS POINTS FOR DETERMINING DESTINATIONS" to Michael Geilich, the entire contents of which are hereby incorporated herein by reference. While this provides sufficient information to either directly find the address point you are looking for, or at least allows for the shortest interpolation so that the error is smallest, it also represents a considerable change in the algorithms used to determine the location from the address and potentially expensive storage in the device for the address point data. Such new and different logic would require significant software updates to the device using this new improved map. In older units it may be difficult, expensive or even impossible to introduce such software change.

SUMMARY

By using projection points, which can include actual known address points projected onto an address segment vector (address segment), address segment vectors can be modified or segmented when distances between projection points and interpolated locations of the projection points exceed a threshold distance. As such, address segments can be replaced with address sub-segments in map databases to improve linear interpolation algorithms for applications such as geocoding and navigation, without requiring any changes to the underlying interpolation algorithms in those applications themselves. The improvement occurs due to the improved map databases including address segment vectors, and including, where needed, address sub-segment vectors.

As such, in embodiments of the present application, situations with varying distributions of actual house numbers along address segments or address segment sides of a street can be accommodated for without requiring changes to interpolation algorithms in existing applications of data such as, for example, in geocoding and in navigation. Further, as will be apparent from the description of example embodiments hereafter, it will be seen that address sub-segment vectors are stored in the map database in place of a corresponding address segment vector when needed (based on exceeding a threshold distance between projection points and interpolation points for example), and thus do not require large amounts of additional storage. This can be particularly advantageous in portable navigation devices (PNDs) where storage is limited. Thus, in embodiments of the present application, segmenting of address segment vectors into address sub-segment vectors enhances address range data for improved interpolation for applications including but not limited to, for example, geocoding and navigation.

At least one embodiment of the present application is directed to a method comprising projecting a plurality of known address points onto an address segment vector of a map database, to create projection points; interpolating locations for addresses of the address points, to create corresponding interpolation points; and segmenting the address segment vector into a plurality of address sub-segment vectors, upon a distance between a projection point and a corresponding interpolation point exceeding a threshold distance.

Another embodiment of the present application is directed to a memory, storing unsegmented address segment vectors and storing the address sub-segment vectors of the method of at least one embodiment addressed above, in place of or in addition to corresponding address segment vectors, upon an address segment vector being segmented.

At least one other embodiment of the present application is directed to a map database, storable on a storage medium. The map database comprises a plurality of address segment vectors; and a plurality of address sub-segment vectors, the plurality of the address sub-segment vectors being stored in the map database in place of a corresponding address segment vector upon a distance between a projection point, corresponding to a known address point projected onto the address segment vector, and a corresponding interpolation point, corresponding to an interpolated location of an address of the address point, exceeding a threshold distance.

At least one other embodiment of the present application is directed to a computer readable medium, comprising the map database of at least one embodiment addressed above.

Another embodiment of the present application is directed to a device including a memory storing a map database, the map database including a plurality of address segment vectors and a plurality of address sub-segment vectors, the plurality of the address sub-segment vectors being stored in the map database in place of a corresponding address segment vector upon a distance between a projection point, corresponding to a known address point projected onto the address segment vector, and a corresponding interpolation point, corresponding to an interpolated location of an address of the address point, exceeding a threshold distance; and a display to display a location of an input or selected address using the stored map database. In at least one other embodiment, the device is a navigation device, the navigation device further including an input device to prompt input or selection of a travel destination; and a processor to calculate a travel route to the input or selected travel destination, wherein the travel route calculation utilizes the stored map database and wherein the display is useable to display the calculated travel route.

Another embodiment of the present application is directed to a system for providing the user with the information corresponding to a desired location. The system comprises a map database including a plurality of address segment vectors and a plurality of address sub-segment vectors, the plurality of the address sub-segment vectors being stored in the map database in place of a corresponding address segment vector upon a distance between a projection point, corresponding to a known address point projected onto the address segment vector, and a corresponding interpolation point, corresponding to an interpolated location of an address of the address point, exceeding a threshold distance; and a processor, to retrieve, using an applications program, at least one address within the address range corresponding to an address segment vector or address sub-segment vector of the map database, in response to a query regarding the desired location.

Finally, at least one other embodiment is directed to a geographical information systems (GIS) based applications program for providing the user with information corresponding to a desired place. The program comprises a map database including a plurality of address segment vectors and a plurality of address sub-segment vectors, the plurality of the address sub-segment vectors being stored in the map database in place of a corresponding address segment vector upon a distance between a projection point, corresponding to a known address point projected onto the address segment vector, and a corresponding interpolation point, corresponding to an interpolated location of an address of the address point, exceeding a threshold distance.

Advantages of these embodiments are set out hereafter, and further details and features of each of these embodiments are defined in the accompanying dependent claims and elsewhere in the following detailed description.

BRIEF DESCRIPTION OF THE DRAWINGS

Various aspects of the teachings of embodiments of the present invention, and arrangements embodying those teachings, will hereafter be described by way of illustrative example with reference to the accompanying drawings, in which.

DETAILED DESCRIPTION OF EXAMPLE EMBODIMENTS

Figure 1:
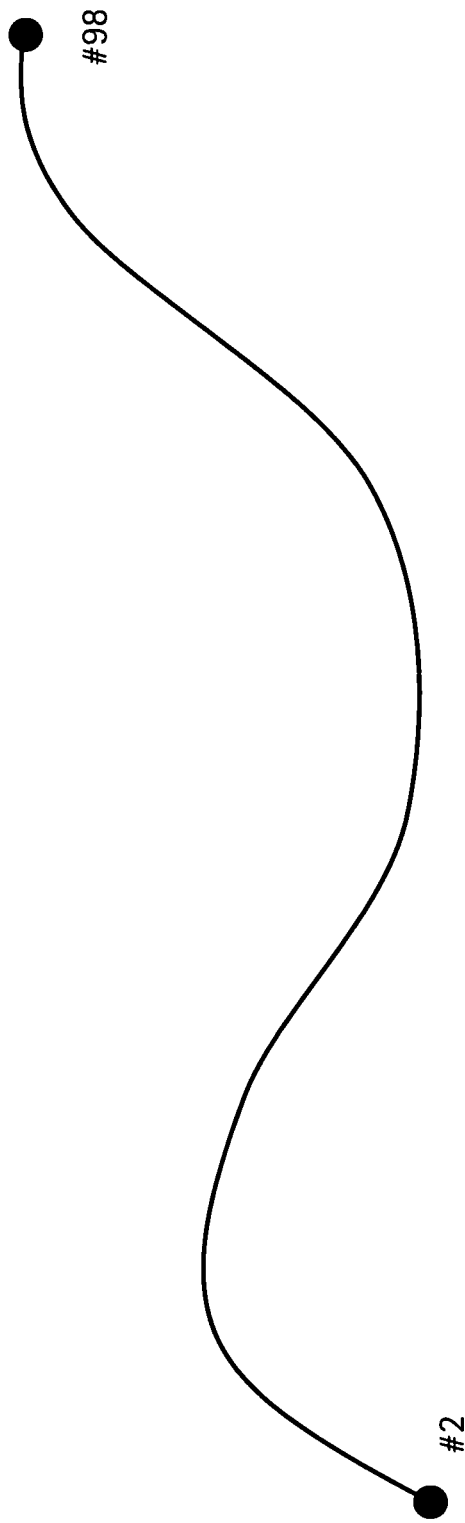
FIG. 1 illustrates an example of a digital map representation of a street segment side.
Figure 2:
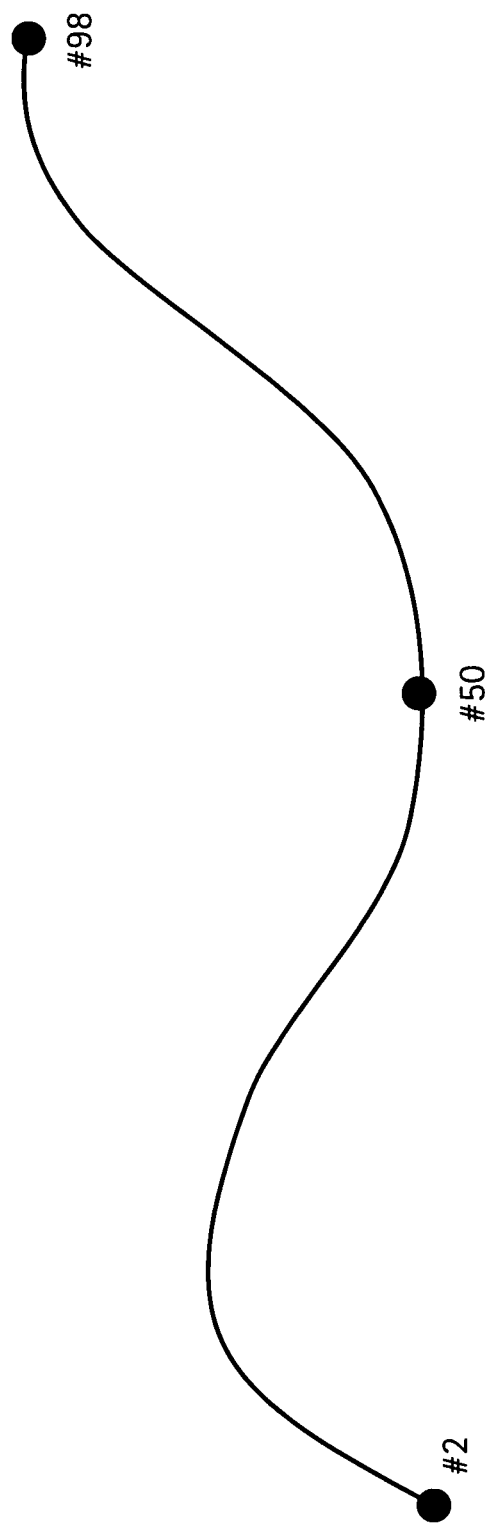
FIG. 2 illustrates an example of linear interpolation used to find intermediate house numbers.
Figure 3:
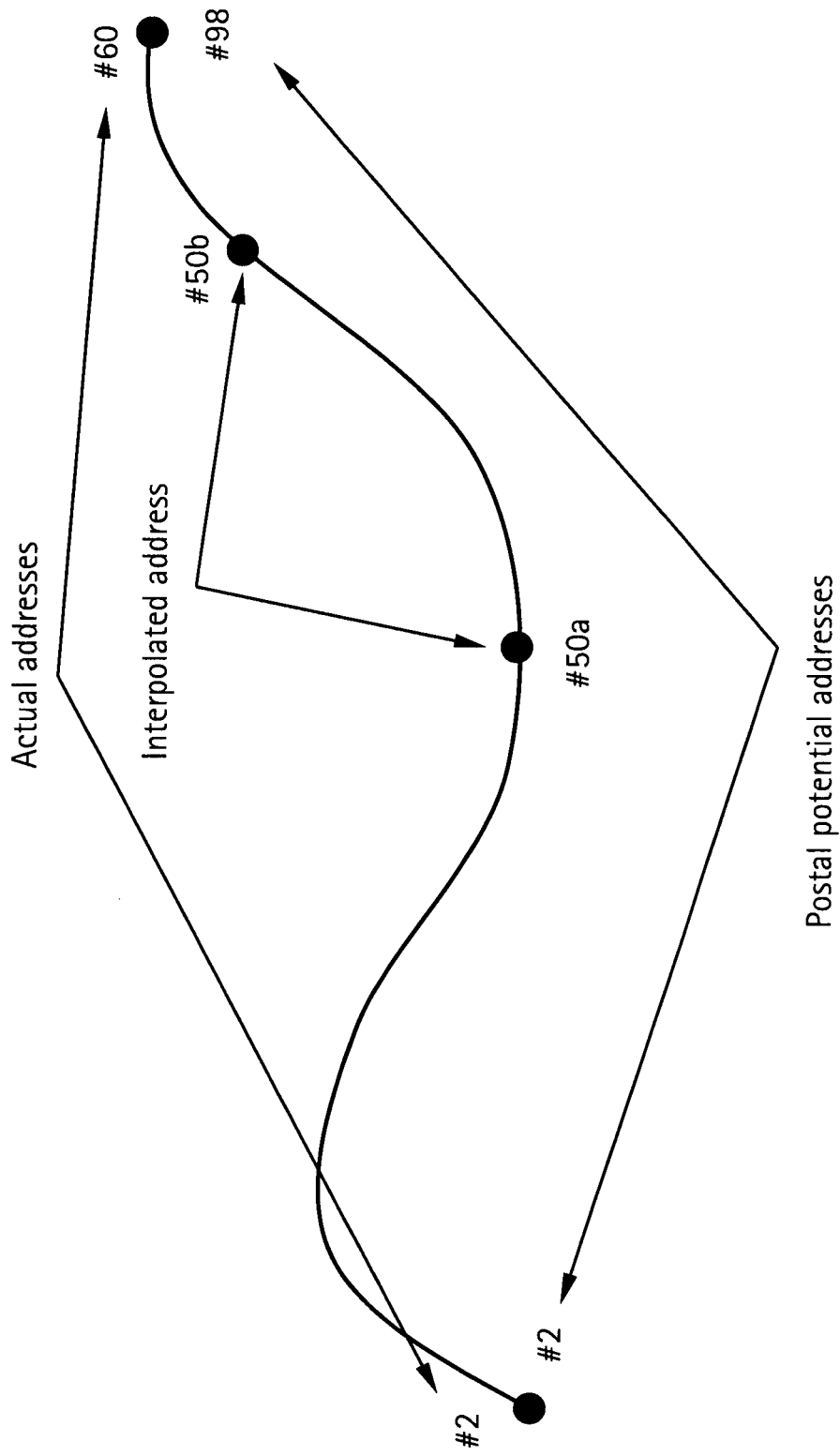
FIG. 3 illustrates an example of interpolation of differences in interpolation on actual vs. potential address ranges.
Figure 4:
FIG. 4 is an example picture showing actual houses at addresses distributed non-linearly along a street segment.

An embodiment of the present application is directed to applying an algorithm to address segment vectors (commonly known as street segments) to segment the address segment vector when it is believed that it will be helpful to improve interpolation for applications including, but not limited to, geocoding and navigation. Such address segment vectors or street segments include portions of road geometry with starting and ending points, wherein the starting and ending points are typically defined by intersections with other streets or features. Street segments generally have two sides, wherein each side typically has its own starting and ending point, and typically has its own range of addresses. The range represents possible addresses that may be found on a particular side of a street segment. It should be noted, however, that starting and ending points of street segments need not just be defined by intersections with other features, but may further be defined as arbitrary sections of geometry within an address range.

Further, it should be noted that aspects of embodiments of the present application are not limited to street segments directed to one side of the street, but may also be applicable to street segments where two sides of the street segment are not considered independently. In such an instance, algorithms of embodiments of the present application may be applied to both sides of the street segment concurrently. In other variations, algorithms of embodiments of the present application may be applied to unaddressed street segments or sides, where techniques may be used to first assign street names and/or address ranges to street segments, and then the street segments may be tested for segmentation based upon algorithms of embodiments of the present application for example.

Digital map databases are known to include address segment vectors or street segments having starting and ending points, street names and other types of attributes, and address ranges representing assigned addresses on that segment. Such digital map databases (map databases) are used in geocoding, GIS and navigation techniques, for example, when locating a place, such as a desired travel destination for example (for example, selected or input through an integrated input and display device of a navigation device for example). Digital map databases (for example, digital map databases that are commonly maintained by vendors of digital map databases and referred herein as digital map source databases) can be stored in a central server (and can be accessed directly for geocoding applications for example), and reduced versions thereof (referenced herein as digital map application databases) can be downloaded or otherwise transferred to memories of devices including but not limited to geocoding devices, in-vehicle navigation devices, personal navigation devices and/or any other devices with navigation capabilities including but not limited to cell phones, PDAs, etc. and/or can be stored in a memory or stored on any type of digital media. Such digital map source databases can include address segment vectors (and/or address sub-segment vectors which will be discussed hereafter) including many types of attributes assigned to the stored address segment vectors (and/or address sub-segment vectors). Typically, digital map application databases will be formed from such digital map source databases and will include address segment vectors (and/or address sub-segment vectors which will be discussed hereafter) with a relatively fewer number of types of attributes assigned to the stored address segment vectors (and/or address sub-segment vectors). Techniques for forming such digital map application databases from digital map source databases and/or copying portions of digital map source databases to form the digital map application databases are known to those of ordinary skill in the art and will not be discussed herein for the sake of brevity.

Such digital map application databases are typically downloadable to a personal navigation device, or any other devices with geocoding and/or navigation capabilities and/or mapping capabilities, by the device accessing and downloading or copying new digital map application databases from the server, periodically via the internet or a mobile network connection for example (such as every few months when new information is received for example), or for in-vehicle navigation devices, by a new updated digital map application database being stored on a CD-Rom for example, wherein the CD-Rom then can be input into the in-vehicle navigation device of the vehicle to update the digital map application database stored in the memory of the in-vehicle navigation device. Such updating techniques are not limited to those discussed above and can include any technique for updating digital map application databases, and are known to those of ordinary skill in the art and will not be discussed herein for the sake of brevity.

Figure 5:
FIG. 5 is an example picture showing actual address points representing building, parcels, etc.

In all such known digital map source databases, a collection of one or more known address points for each of the street segments (address segment vectors of the digital map database) exists (noting that digital map source databases include known address points while digital map application databases typically do not include, but can include if storage constraints permit, known address points). As shown in FIG. 5, for example, such known address points #168-172, 180 and 184 have a known geographic position and one (#180 and #184) or more (#168-172) address numbers or addresses corresponding to that location along a street segment or address segment vector. Address points may represent position and numbering of physical structures, parcels, or other address location, and are fixed points which are known to be actual locations of buildings, parcels, etc. These can include exact locations of, for example, emergency points of interest such as hospitals and police stations for example; places of business which have paid for aerial photography (such as restaurant chains for example) to have an exact location of their business placed within a map database; exact address locations obtained from tax maps, boundary maps, etc. In any event, such address points represent the actual location and numbering of physical structures, parcels, etc. While such known address points are very desirable in that they provide exact locations, inclusion of too many address points (especially in digital map application databases) creates memory storage issues, especially for devices with small amounts of memory such as personal navigation devices and/or any other small/portable devices with navigation capabilities such as cell phones, PDAs, etc. Furthermore, most existing applications have no special logic for the use of these known address points.

Figure 6:
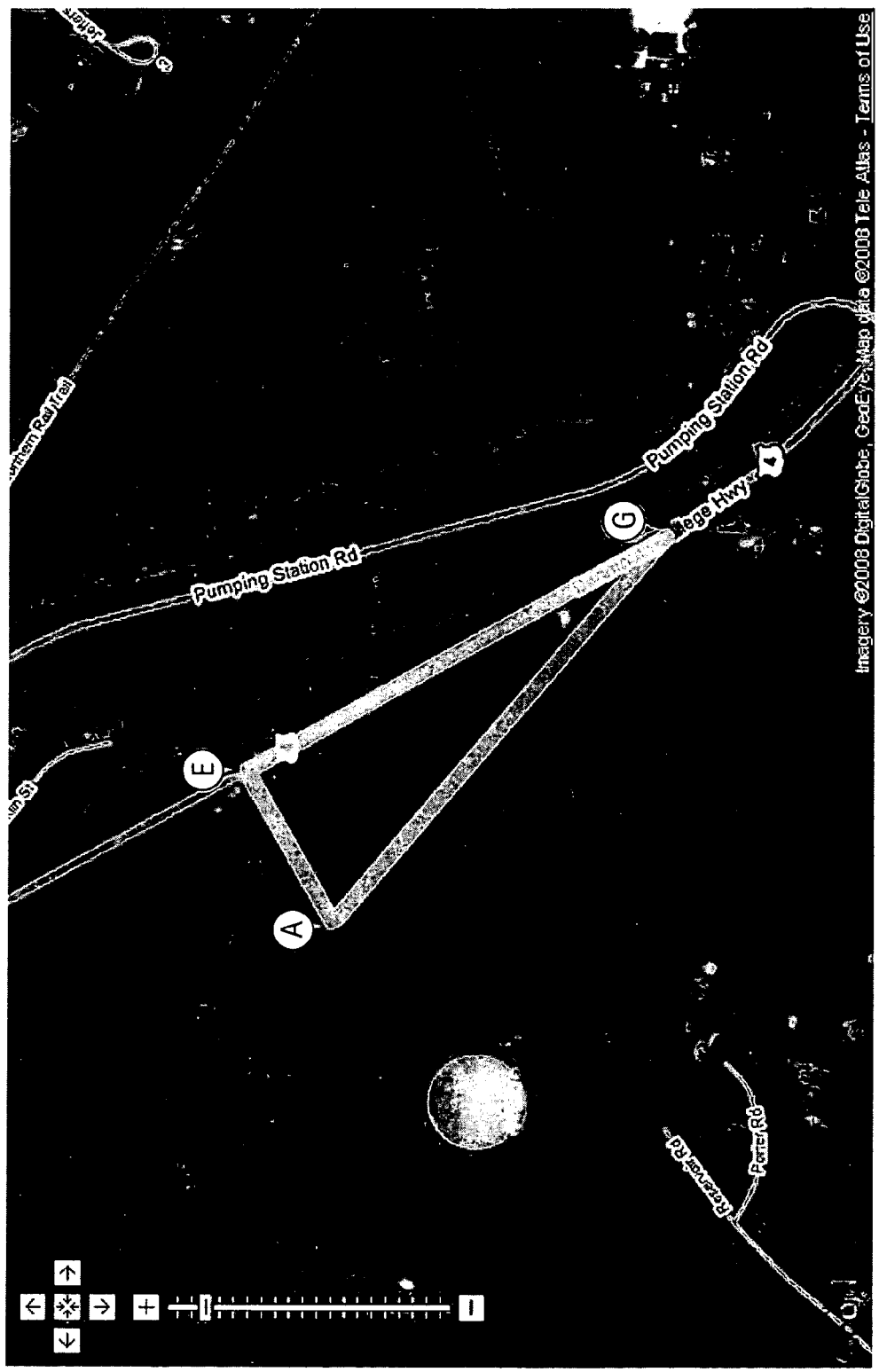
FIG. 6 illustrates an example picture showing an actual address point, a projection point and an interpolation point.

FIG. 6 illustrates an example embodiment as used in an application on a hypothetical system. The application could be used on a hand-held device, such as a PDA or a cell phone or navigation device, or on a computer or laptop or over the Internet. An example search is performed by a user using the hypothetical map application for 156 Dartmouth College Highway, Lebanon N.H. The application currently would display the location of the address on a map in the bubble containing a dot G as the interpolation point. However, the actual address is at point A. Embodiments of the present invention, on the other hand, could use the address point A, a projection point E and a distance between projection point E and interpolation point G to determine if the distance therebetween (in actuality 263 meters) exceeds a threshold distance. If so, embodiments of the present application can use segmenting of address segment vectors to find a more accurate location of buildings or the lots where the buildings are located, which is clearly not at the bubble G in FIG. 6. This address point A would be stored in the source map database. The segmenting would then be accomplished in new versions of application maps which could be distributed to various devices to be used in their applications. In this way, embodiments of the present invention are able to provide more accurate positioning information as will be described hereafter.

Figure 7:
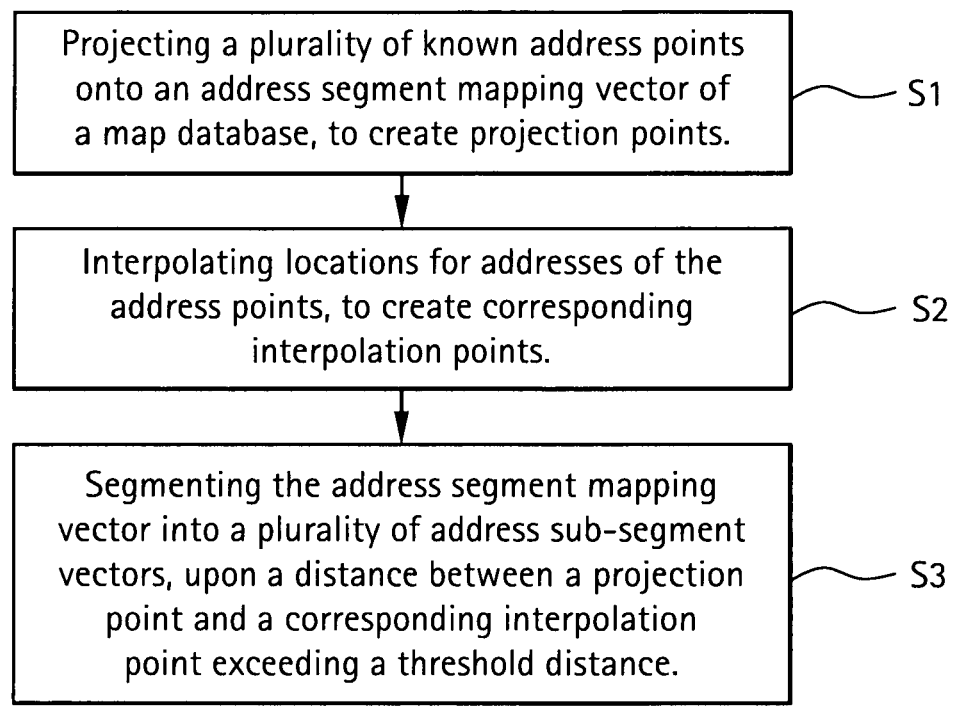
FIG. 7 illustrates an example embodiment of a method of the present application.

At least one embodiment of the present application is directed to a method which utilizes these known address points of a digital map source database (or a digital map application database if such known address points existed therein) in an efficient way. In embodiments where the present invention utilized these known address points of a digital map source database, the results may be transformed into a digital application map database and distributed to devices running applications that can use then use the embodiments of the present invention in an efficient way. In an embodiment of the present application as shown in FIG. 7, a method includes projecting a plurality of known address points onto an address segment vector of a map database, to create projection points (S1); interpolating locations for addresses of the address points, to create corresponding interpolation points (S2); and segmenting the address segment vector into a plurality of address sub-segment vectors, upon a distance between a projection point and a corresponding interpolation point exceeding a threshold distance (S3). An example of such an embodiment will be explained hereafter with regard to FIGS. 8-10.

Figure 8:
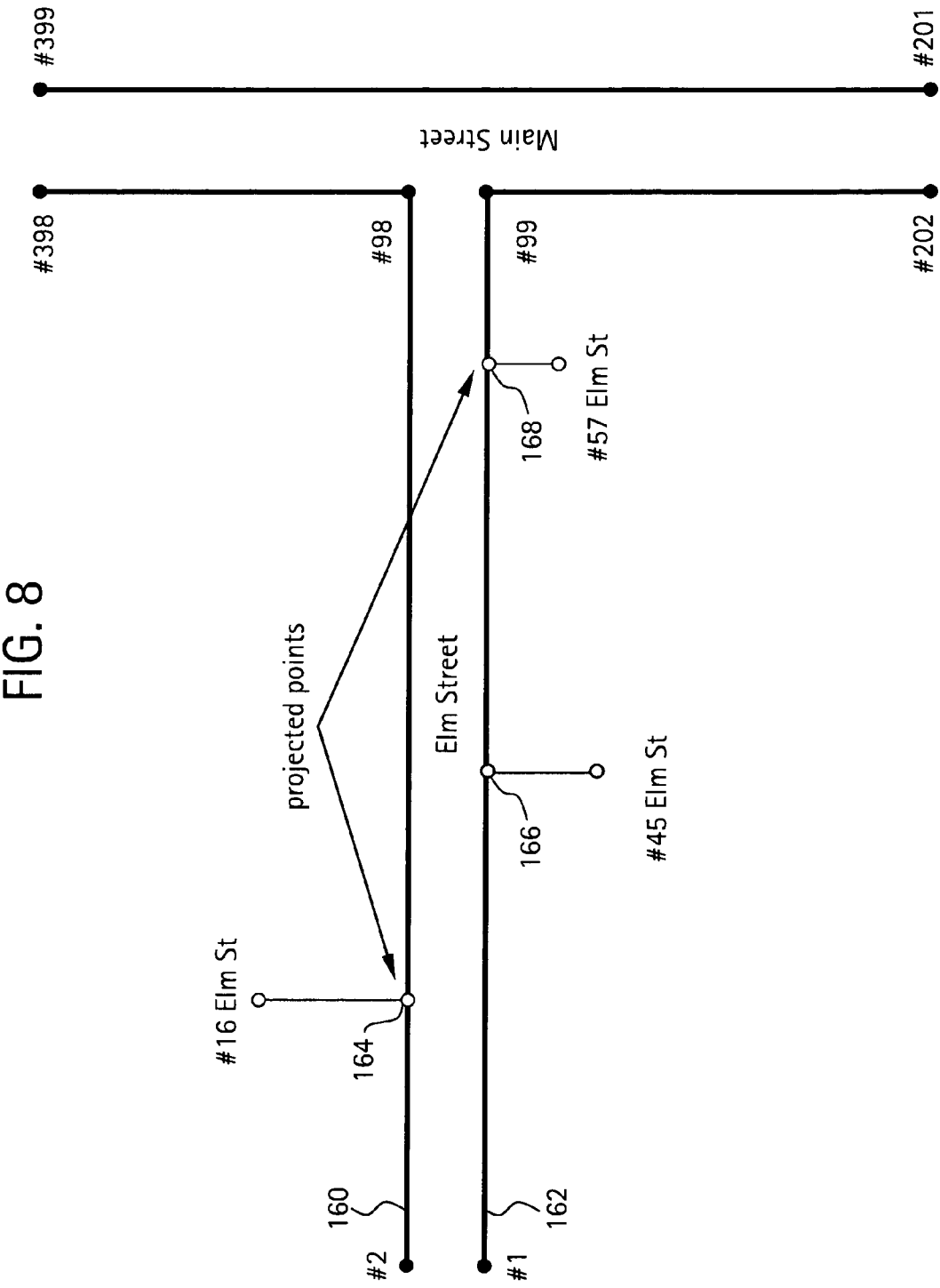
FIG. 8 illustrates an example embodiment of address points projected onto street segments.

As shown in FIG. 8 for example, for given street segments or side of a street segment, it is determined which address points correspond thereto. For example, Elm Street of FIG. 8 includes a first side 160, with addresses ranging from #2 to #98; and a second side 162, with addresses ranging from #1 to #99. Stored within the digital map database are known address point #16 Elm Street (falling within the range #2 to #98 and thus corresponding to side 160 of the Elm Street street segment or address segment vector); and known address points #45 Elm Street and #57 Elm Street, falling within the address range of #1 to #99 and thus corresponding to street segment side 162 of Elm Street (the Elm Street address segment vector). Thus, address points are assigned to a street segment with the same street name, where address numbers of the points are within the range as typically assigned to a street segment or street segment side (an address segment vector). Further, the parity of the address numbers is typically used to assign street segment side, noting that the parity of the address numbers of the particular address point can be used to match the parity of the address ranges of the underlying segment sides to determine which side of the street segment corresponds to the particular address point (the even numbered point #16 is on the side 160 of Elm Street containing the even numbered addresses, and the odd numbered address points #45 and #57 are placed on the street segment side 162 containing the odd numbered addresses of the Elm Street street segment). It should be noted that for the purposes of embodiments of the present application, an address segment vector can include an entire street segment, and also can include a side of a street segment (such as elements 160 or 162 of FIG. 8 for example). Again, the address points #16 Elm Street, #45 Elm Street, and #57 Elm Street as shown in FIG. 8 correspond to known address points which are actual positions and numbering of physical structures, parcels, locations, etc. as explained above and are known actual locations.

In determining which known address points correspond to which street segments, and/or which sides of which street segments, care must be taken because, where the street segments and/or address points are not positioned accurately with respect to reality, an address point appearing to be on one side of a street may in reality be located on the other side of the street. In cases where street segment sides do not have corresponding address ranges, other techniques may be used to assign address points to correct sides of street segments. For example, geographic proximity is one technique that may be used.

Once known address points are assigned to a street segment or street segment side (address segment vector), techniques including but not limited to spatial techniques can be used to project the location of the known address points onto a street segment side or street segment. As shown in FIG. 8, one technique for projecting known address points onto an address segment vector of a map database, is dropping a perpendicular onto a street segment side. As such, a known address point such as #16 Elm Street may be used to create a projection point 164 into an address segment vector (the address segment vector for the street side 160 of Elm Street, containing the even numbered range of #2 to #98 for example). Similarly, other projection points 166 and 168 can be created by projecting known address points #45 Elm Street and #57 Elm Street, respectively for example, onto the address segment vector for Elm Street, including the odd numbered address range of #1 to #99 for example. Thus, in one embodiment of the present application, as shown in FIG. 8 for example, address points are projected onto a relatively nearest location along a relatively nearest street segment side. The formation or creation of such projection points may also include checks for assignment, such as assuring that the parity of projection points and side segment ranges are consistent (for example, checks can be made to ensure that an odd numbered address points #45 and #57, when projected, are projected onto a side of a street segment or address segment vector including an odd range, such as the range of #1 to #99 as shown in FIG. 8 for example).

Figure 9:
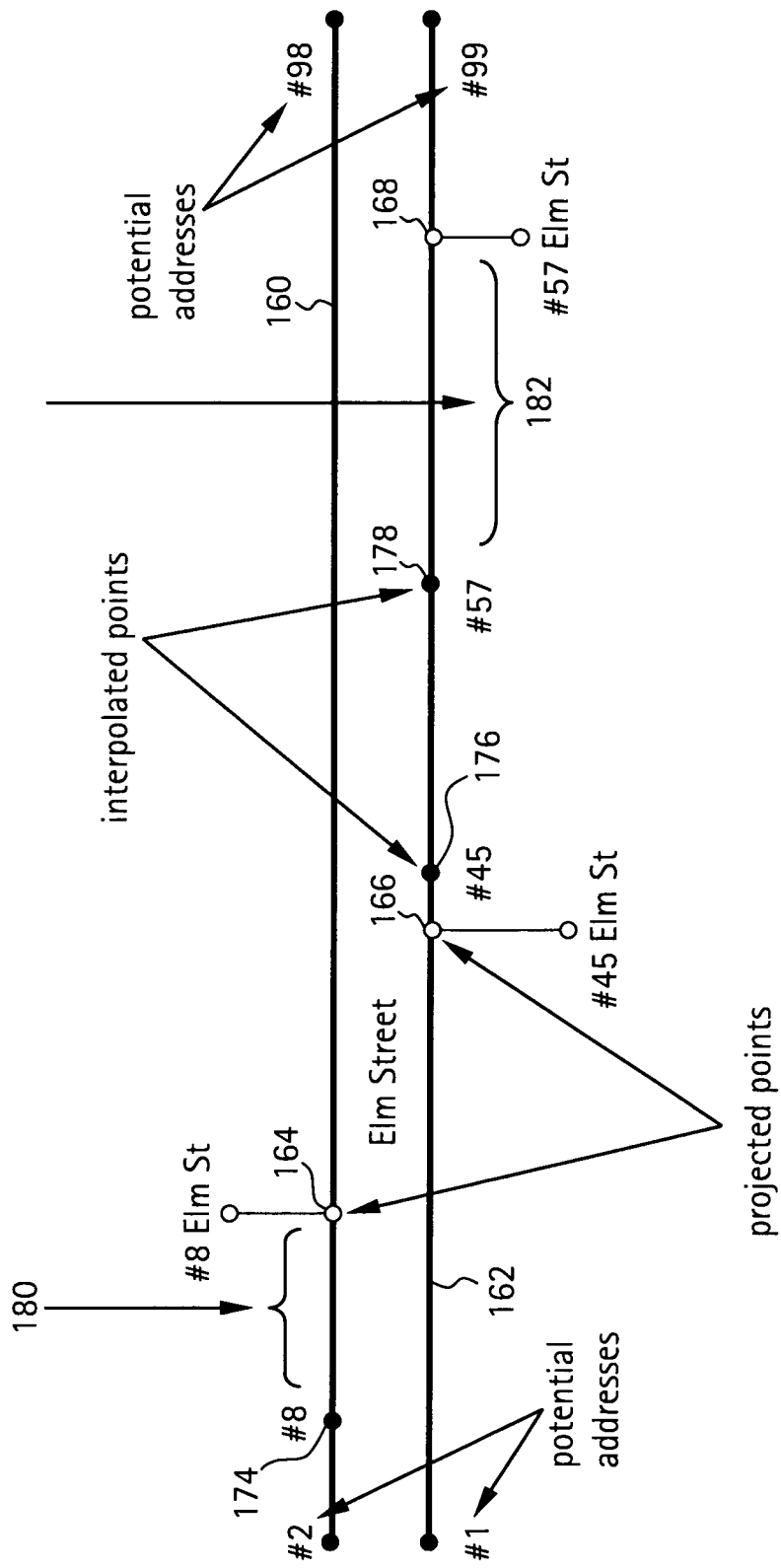
FIG. 9 illustrates an example embodiment of projection points, interpolation points and distance therebetween.
Figure 10:
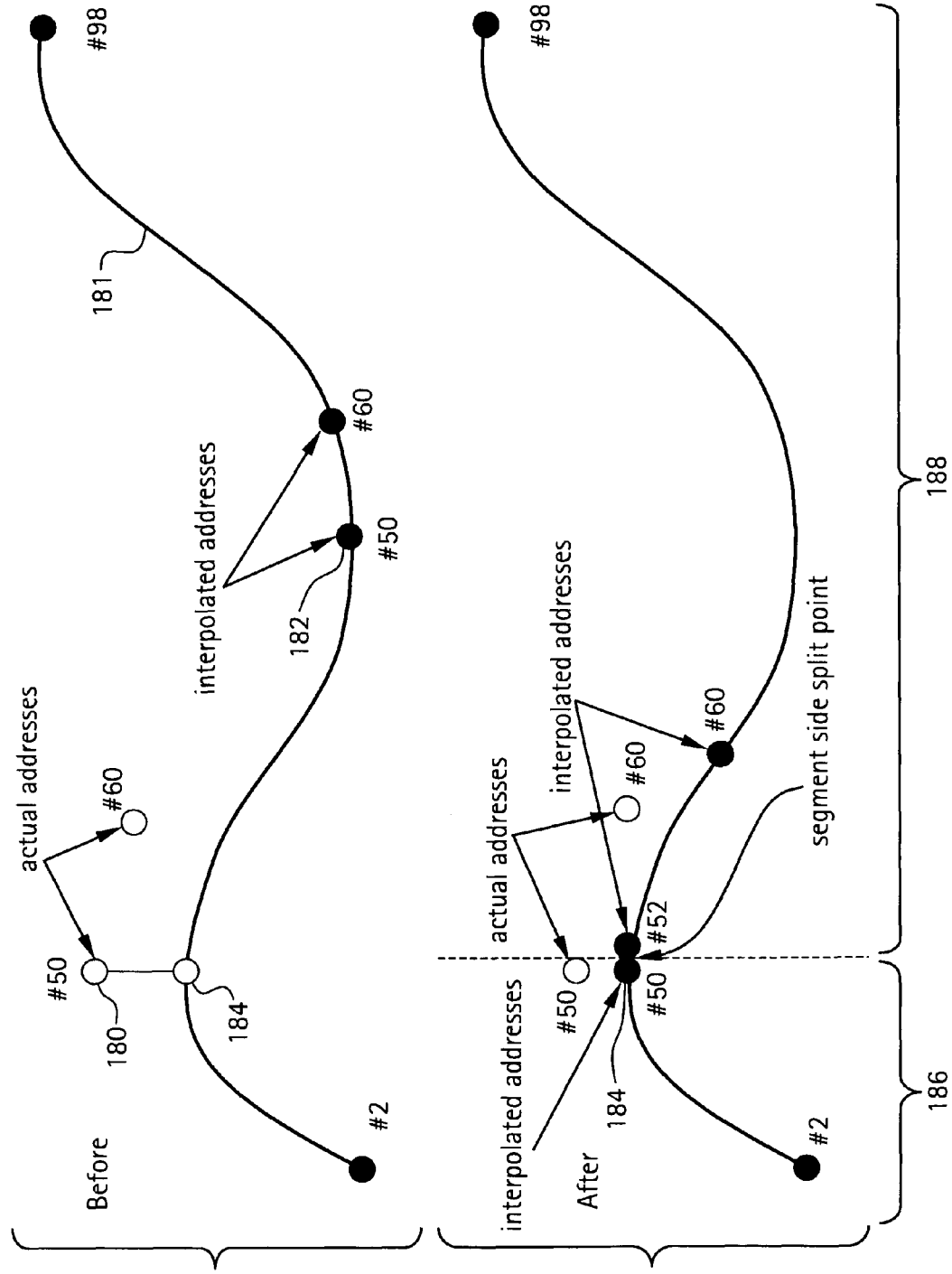
FIGS. 10a and 10b illustrate example embodiments of a known interpolation technique (10a) and improved interpolation after street segmentation (10b)

FIG. 9 shows an example of a next step of the method of an embodiment of the present application. In this step, interpolation points are created, in addition to projection points. As shown in FIG. 9, projection points 164, 166, and 168 remain. In addition to these points, corresponding interpolation points are created for addresses of the address points. For example, utilizing known interpolation techniques such as linear interpolation for example, an interpolation point 174 may be created for the address #8 Elm Street, representing an interpolated location of the address along Elm Street, of the address point for #8 Elm Street. As can be seen, the interpolation point exists at an interpolated location following the curvature of the street segment, based upon its numerical position within the address range of the street segment (address #8 is positioned close to address #2, as would be expected by known linear interpolation techniques). As such, interpolation point 174 is formed in a known manner by interpolating a location (using known interpolation techniques) of an address, along the address segment vector for Elm Street, of the address point for #8 Elm Street, within the address segment vector. Similarly, an interpolation point 176 may be formed or created for the known address #45 Elm Street, by interpolating a location of the address, along the address segment vector for Elm street, of the address point for #45 Elm street, and an interpolation point 178 may be formed or created for the known address #57 Elm Street, by interpolating a location of the address, along the address segment vector for Elm street, of the address point for #57 Elm street.

Once the projection points 164, 166 and 168 for example and corresponding interpolation points 174, 176 and 178 (interpolation points formed or created for an Elm street address, for example, for which a projection point was previously created) for example are created, these points can be used in a method of an embodiment of the present application, to divide the street segment or address segment vector into sub-segments or address sub-segment vectors. This may be done, for example, in situations which are helpful in more accurately conveying true location of addresses, where linear interpolation of addresses of the sub-segments or address sub-segment vectors in the map database will be closer to the projection points than linear interpolation on the street segment or street segment side as a whole. Specifically, in an embodiment of the present application, the address segment vector is segmented into a plurality of address sub-segment vectors upon a distance between a projection point and a corresponding interpolation point (a projection and interpolation point pair) exceeding a threshold distance. It should be noted that in the embodiments, the distance can actually be a function of distance, such as an absolute value, a square, a maximum or the like; or a function of a plurality of such distances, such as the average, median, mean, square average, root mean square or the like, as might be known by those skilled in the art.

In an embodiment of the present application, for any given street segment or street segment side, a distance may be calculated between pairs of projection and corresponding interpolation points (also known as corresponding projection and interpolation points or projection and interpolation point pairs) that relate to the same address (interpolation points formed or created for an Elm street address, for example, for which a projection point was previously created such as the pair of interpolation point 174 and projection point 164 for example). In at least one embodiment, a relatively largest distance among distances between corresponding projection and interpolation points may be determined. In the example shown in FIG. 9, such a distance may be calculated for each street segment side, wherein the relatively largest distance between projection and interpolation points for street segment side 160 is the distance identified by element 180 of FIG. 9 for example, namely the distance between interpolation point 174 and projection point 164 for #8 Elm Street (as this is the only distance calculated for street segment side 160); and is the distance 182 for street segment side 162 of the Elm Street street segment, which is relatively larger than the distance for the projection point 166 and interpolation point 176 for #45 Elm Street.

Thereafter, for each of these relatively largest distances between corresponding projection interpolation points, a comparison can be made to a threshold distance, wherein segmenting can then be performed thereafter if, for example, the determined relatively largest distance exceeds the threshold distance. Once address segment vectors are used to create address sub-segment vectors, the address sub-segment vectors can be stored (with all of the attributes of corresponding address segment vectors being assigned thereto) in the digital map source databases (of the vendor for example), along with the address segment vectors. From there, digital map application databases can be created, in a known manner from the digital map source databases. However such digital map application databases can now include, based upon at least one embodiment of the present application, the newly created address sub-segment vectors (each including the limited number of attributes typically assigned to the address segment vectors of a digital map application databases), at least one of in place of and along with the address segment vectors.

Such a threshold distance need not be a constant distance used for all comparisons. Such a threshold may be relatively small in urban areas, for example. When a location is off by even a relatively small distance of, for example 100-200 yards in an urban area containing many buildings, a view of a user may be impaired, making it difficult for a user to find a particular desired location because the view of the user even a few hundred yards away may be blocked by other buildings or structures for example. Further, in a rural area, a relatively larger threshold may be used (such as a quarter mile for example), wherein even if a user would end up at an address location far away from the actual location of a desired destination, the user could still easily see the actual location of the desired travel destination, such as a building for example, as the user's view will unlikely be impaired by the existence of other buildings.

Thus, the embodiments of the present application are not be limited to a specific threshold and can use different thresholds, such as different thresholds in different areas (for example, 100-200 yards in an urban or city area, or a quarter mile in a rural area), further noting that the embodiments of present application are not limited to the particular thresholds mentioned herein (including the example urban and rural thresholds).

The embodiments of the present application are designed to operate with any threshold which will create proper segmenting of address locations in the digital map application database of the device so that a user using a geocoding and/or navigation technique, for example, can end up utilizing the existing interpolation algorithms within the geocoding device or navigation device, within close enough proximity of a building or other travel destination to notice or see the correct and desired actual destination from the destination indicated by the geocoding device and/or navigation device. It should further be noted that as aspects of the embodiments of the present application are designed to, upon the digital map source databases (of the vendor for example) including sub-segmented vectors being used to create digital map application databases including the sub-segmented vectors for storage in geocoding applications or navigation devices for example, enhance geocoding and/or navigation abilities of the geocoding device and/or navigation device. Such a stored digital map application database including the sub-segmented vectors of an embodiment of the present application may subsequently be used in conjunction with existing interpolation techniques previously described, to further enhance utilization of geocoding and/or navigation devices to arrive a user at a desired location.

It should be noted that a variety of techniques may be used to determine the interpolation threshold used in the methodology described above, in deciding when to segment and when segmenting is desired or not desired. In one embodiment of the present application, the interpolation threshold or threshold distance may be a relatively largest acceptable distance between an interpolation point and a projection point, which can also be considered an estimate of accuracy of a location. This relatively largest, or maximum acceptable value for example, may vary with geography (urban versus rural as explained above, for example), or for other reasons. Based upon such an established threshold, a relatively largest distance among distances between corresponding projection an interpolation points can be determined, and the segmenting of an embodiment of the present application may be performed upon the determined relatively largest distance exceeding the threshold distance.

In another embodiment of the present application, the threshold distance may be set, in deciding when to segment, to allow only a maximum or relatively largest number of interpolation addresses to fall between a projection address point and its corresponding interpolation point. For example, if the threshold is set at a maximum of two addresses, and if interpolation addresses #34, #36, and #38 fall between a projection and interpolation point pair for address #32, then the threshold has been exceeded and segmenting should take place. This method could require interpolation addresses for every address within range. Other methods for establishing and evaluating interpolation thresholds are possible as well.

In another embodiment of the present application, the threshold distance may be set, in deciding when to segment, to allow segmenting upon an average determined distance, determined between all projection and corresponding interpolation point pairs along an address segment, exceeding the threshold distance.

In another example embodiment, the interpolation threshold value may be set to create only a limited number of sub-segments or address sub-segment vectors. Certain applications (such as navigation applications for example, in a small device with limited memory) may have only limited storage in memory for address segments and address sub-segment vectors, and different thresholds may be used for different applications, resulting in greater positional accuracy where storage can accommodate greater numbers of address sub-segment vectors. One example of limited memory may be that of a personal navigation device (PND) which is portable, but which includes only a limited amount of memory.

In the embodiments of the present application discussed above, the projecting, interpolating and determining may be performed for multiple segmenting into address sub-segment vectors. Thus, the embodiments discussed above, the address sub-segment vectors may further be segmented into a plurality of address sub-segment vectors until certain conditions are met. For example, segmenting of the address sub-segment vectors can take place until the relatively largest or maximum distance does not exceed the threshold distance or until a maximum number of subdivisions is reached. Further, in another embodiment, segmenting of the address sub-segment vectors can take place until an average distance between projection points and corresponding interpolation points of the address sub-segment vector is less than the threshold distance. Thus, in at least one embodiment, the projecting, interpolating and determining are performed for multiple segmenting into address sub-segment vectors, such that at least one of an average distance and a maximum distance and a function of distance between projection points and corresponding interpolation points within each of the address sub-segment vectors is less than the threshold distance or until a maximum number of subdivisions is reached. Note that such iterations may include recomputation of interpolations. Note also that multiple sub-segments may be computed directly without the use of iterative methods.

Again, embodiments of the present application are not limited to segmenting address segment vectors corresponding to single sides of a street segment as shown in FIG. 9. In at least one embodiment of the present application, both sides of a street segment 160 and 162 may be considered together, wherein the corresponding repair of projection and address points with the relatively largest distance may be found for the plurality of sides. For example, as shown in the example of FIG. 9, element 182 would represent a relatively largest distance among distances between corresponding projection and interpolation points when both sides of the Elm Street segment or address segment vector are considered together. In either event, whether a single relatively largest distance 182 is utilized, or whether a relatively largest distance for each side of street segments 160 and 162 are utilized (namely the distances 180 and 182), the following techniques are equally applicable for segmenting one or both sides of a street segment. For the purposes of embodiments of the present application, an entire street segment, or individual sides 160 and 162 of a street segment can be considered address segment vectors, and any segmentation thereof can be considered address sub-segment vectors.

Accordingly, in embodiments of the present application, if a distance between a projection point and a corresponding interpolation point is found to exceed an interpolation threshold distance, the address segment vector may be segmented as discussed in the embodiments above. In at least one embodiment, the segmenting may be performed at a point along the address segment vector or address sub-segment vector that reduces an average distance between all projection point and corresponding interpolation point pairs. In at least one non-limiting example, the point may be a projection point (although the embodiments of the present application should not be considered limited to use of a projection point as the segmenting point). Thus, in at least one embodiment, the address segment vector or address sub-segment vector may be segmented at one of the projection points along the address segment vector or address sub-segment vector. A non-limiting example embodiment will be explained as follows.

In an example embodiment, the projection point, such as point 164 for the street segment side 160 or 168 for the street segment side 162, may become the "split point" for segmenting the address segment vector. Thus, the address segment vector may be split or segmented at this point, and the split point address may be assigned to an end point of an address range of one of the resulting address sub-segment vectors and an adjacent address (within range and direction) may be assigned to another address sub-segment vector.

An example embodiment illustrating a non-limiting example of segmenting of an address segment vector into address sub-segment vectors is shown with regard to FIGS. 10a and 10b. FIG. 10a shows an address segment vector (street segment) with an address range of #2 to #98. It further shows the actual address of a known address point #50 identified by element 180 and an interpolated address point of known address point #50 within the middle of the address range #2 to #98 of the address segment vector. This is identified by element 182. The projection point of the actual address is shown by element 184. By utilizing a distance between projection point 184 and interpolation point 182, and by comparing this distance to a threshold distance, it can be determined that segmentation is needed if the distance between corresponding projection and interpolation points 184 and 182 exceeds the threshold distance.

If it is determined that the distance between corresponding projection point 184 and interpolation point 182 exceeds the threshold distance, then segmenting of the address segment vector into a plurality of address sub-segment vectors can occur in the manner of any of the embodiments of the present application described above. As shown in FIG. 10b, the projection point 184 of the actual address #50 can be used as the "split point" for segmenting the address segment vector into a plurality of address sub-segment vectors. If so, then a first sub-segment 186 can then be formed wherein the address of the known address point is used as an end point for example, with an address range of the address sub-segment vector 186 ranging from #2-#50. A next address point in the range of the initial address segment vector can then be used as a beginning address for the other address sub-segment vector 188, creating an address range from #52-#98 as shown in FIG. 10b.

As the actual address #50 is now made part of the address range of the first address sub-segment 186, it can be appreciated that interpolation utilizing the address sub-segment vectors 186 and 188 will be much improved from utilization of the address segment vector shown in FIG. 10a. For example, if a user of a navigation device desires to find the location of an address #60, the navigation device using a digital map application database storing the address sub-segment vector 188 in its memory (instead of, or in addition to if memory capabilities exist for example, the address segment vector 181 of FIG. 10a) will find a location within this address sub-segment vector 188 which is much closer to the actual location of the building corresponding to the address #60. As can be seen when compared to that of FIG. 10a, if the navigation device instead utilized a digital map application database including only the address segment vector 181 ranging from #2 to #98 of FIG. 10a, known interpolation techniques would end up with a result for #60 which is much closer to the interpolated address 182 of FIG. 10a, and thus would be far off from the actual location of the building corresponding to the address #60 (which is actually within address sub-segment vector 188 of FIG. 10b).

Accordingly, if the address #50 is the split point in an address segment vector side with an address range of #2 to #98, after segmenting, one sub-segment thereof will be assigned an address range of #2 to #50 and the other a range of #52 to #98. Alternatively, one sub-segment side (one address sub-segment vector) can be assigned an address range of #2 to #48 and the other a range of #50 to #98. Embodiments of the present application are equally applicable to either variation. In addition, in another alternative embodiment, the split point may be included in both address ranges, assuming the system/application can handle the ambiguity of two #50s for example, so that the start address of one sub-segment and the end address of another sub-segment are equal, instead of being separated by one address.

In one example embodiment of the present application, the split point may be assigned to the sub-segment or address sub-segment vector that reduces an average distance between all intermediate projection and interpolation points on a sub-segment. In another example embodiment, the split point may be assigned to the sub-segment that reduces a relatively largest distance between any pair of intermediate projection and interpolation points on the sub-segment. Other methods of assigning such a split point can be equally applied for segmenting an address segment vector, such as assigning the split-point to the sub-vector that makes the sub-ranges closest in size for example, as would be obvious to one of ordinary skill in the art.

After splitting an address segment vector into a plurality of address sub-segment vectors, the process may be repeated for each of the resulting address sub-segment vectors. In other words, the address ranges of each address sub-segment vector may be assigned as explained above, and the plurality of known address points may be separately projected onto each address sub-segment vector to create projection points; and locations for the projection points, separately for each address sub-segment vector, can be interpolated to create interpolation points. Thereafter, upon a distance between a projection point and a corresponding interpolation point exceeding the threshold distance, the address sub-segment vector can be further segmented into a plurality of address sub-segment vectors. This can be repeated for each address sub-segment vector and can be further continuously repeated as needed, until the relatively largest distance determined for any projection and interpolation pair for any address sub-segment vector does not exceed the threshold distance. In at least one embodiment, the segmenting may be performed at a point along the address segment vector that reduces an average distance between the projection point and corresponding interpolation point pairs. In other embodiments, the computation of more than two address sub-segment vectors can be accomplished by other iterative methods or may be accomplished by various non-iterative computations known to those skilled in the art.

Thus, in an example embodiment, the known address points may be re-projected onto their corresponding address sub-segment vectors, interpolation points may then determined or created for addresses of the address points, distances between corresponding projection and interpolation point pairs may then be calculated, and projection and interpolation point pairs with the relatively largest distance therebetween may then be chosen and compared to the interpolation threshold. Alternatively, in another example embodiment, the known address points may be re-projected onto their corresponding address sub-segment vectors, interpolation points may then be determined or created for addresses of the address points, and address sub-segment vectors may be further segmented into a plurality of address sub-segment vectors until an average distance between projection points and corresponding interpolation points of the address sub-segment vector is less than the threshold distance. If exceeded, the address sub-segment vector may be split again, for example at the location or a point such as a projection point, and the process may be repeated recursively for each street sub-segment (address sub-segment vector) or for each street sub-segment side (address sub-segment vector) until all distances between corresponding projection and interpolation points for an address sub-segment vectors are under the interpolation threshold, or until the low and high end of the segment address ranges are the same (wherein an address sub-segment vector includes only a single house number), or until no projection points remain for an address sub-segment vector.

Digital map source and application databases are known to include address segment vectors or street segments having starting and ending points, street names and other types of attributes, and address ranges representing assigned addresses on that segment, with digital map source databases having address segment vectors or street segments with many more attributes than address segment vectors or street segments of digital map application databases. Digital map application databases, created from digital map source databases of an embodiment of the present application, will include address sub-segment vectors, at least one of in place of and in addition to address segment vectors, each address sub-segment vector including the attributes of the corresponding address segment vector previously stored in the digital map application database before being copied or created from the digital map source database of an embodiment of the present application (including address sub-segment vectors). Such digital map application databases may be used in geocoding, GIS and navigation techniques, for example, when locating a place, such as a desired travel destination for example (for example, selected or input through an integrated input and display device of a navigation device for example). Such digital map application databases can be stored in a central server when used in geocoding examples, can be stored within an in-vehicle navigation devices, personal navigation devices and/or any other devices with navigation capabilities including but not limited to cell phones, PDAs, etc. and/or stored on any type of digital media.

Such digital map application databases are typically downloadable to a personal navigation device (PND), or any other devices with navigation capabilities and/or mapping capabilities such as a PDA, cell phone, etc. by accessing and downloading or copying new digital map application databases (such as new digital map application databases including address sub-segment vectors of an embodiment of the present application) periodically via the internet or a mobile wireless connection for example (such as every few months when new information is received for example), or for in-vehicle navigation devices, by a new updated digital map application database being stored on a CD-Rom for example, wherein the CD-Rom then can be input into the in-vehicle navigation device of the vehicle to update map information stored in the memory of the in-vehicle navigation device. Such updating techniques are not limited to those discussed above and can include any technique for updating map databases.

Thus, digital map application databases including address sub-segment vectors obtained from any of the embodiments explained above, resulting from segmented address segment vectors or segmented address sub-segment vectors, may then be stored (in a central server, on a CD-ROM or other computer readable medium for subsequent storage in a memory of an in-vehicle navigation device for example, in a memory or a navigation device, etc.) at least one of in place of and in addition to a corresponding address segment vector. Such storage can occur in a memory for example, such as a memory in a device for geocoding and/or a navigation device and/or in a central server. When stored in place of or in addition to a corresponding address segment vector, any or all attributes of the original address segment vector may then be assigned to the resulting address sub-segment vectors. Most importantly is the maintaining of attributes concerning either side of the split point, wherein address numbers (and other attributes) are assigned thereto or maintained. In any event, the address numbers of the address segment vector must be assigned, in some allocated fashion, as attributes of the resulting address sub-segment vectors.

Once the address sub-segment vectors are created, the plurality of address sub-segment vectors may be stored in a digital map application database of a memory in an embodiment of the present application, in place of (or even in some instances in addition to) a corresponding address segment vector (wherein the term "memory" may include but is not limited to a central server memory for subsequent download to a device with navigation capabilities, a CD-ROM, or even a memory of a device such as a navigation device, if the device has the capability to perform the segmenting process of at least one embodiment discussed above). For example, as shown in the example of FIGS. 10a and 10b, in place of the address segment vector #2 to #98 (element 181 of FIG. 10a) for example, address sub-segment vectors #2 to #50 (element 186 of FIG. 9b) and #52 to #98 (element 188 of FIG. 10b) can be stored. Further, these address sub-segment vectors 186 (with an address range #2 to #50) and 188 (with an address range of #52 to #98), can be stored in place of the address segment vector for an address range of #2 to #98 as shown in FIG. 10a, and these address sub-segment vectors can be stored along with other address segment vectors or address sub-segment vectors in the digital map application database of a memory. For example, upon the distance between projection and interpolation points, such as a relatively largest distance or determined average distance for example, not exceeding the threshold distance for an address segment vector, the address segment vector may be stored or maintained in a database and/or in a memory without further segmenting. As such, only address segment vectors (or sub-vectors) which, when segmented, would help a user in finding a desired location, need be segmented and stored in memory. Thus, an unnecessarily large amount of address sub-segment vectors need be stored in memory, thus improving interpolation algorithm performance and not unnecessarily increasing needed memory space. This is especially important in portable and hand-held navigation devices such as PNDs, cell phones, PDAs and other devices with navigation capabilities, but only limited memory capacity.

For example, if a distance between corresponding projection and interpolation points are under the interpolation threshold, an address segment vector remains stored (along with their attributes) in memory. However, if the distance between projection and interpolation points is over the interpolation threshold, the address segment vector may be split into address sub-segment vectors, for example, at a projection point of a known address point, noting that the split may be made independent on which address range (including the split point as an end point of an address sub-segment vector or a start point of an address sub-segment vector) provides a relatively smallest distance between projection and interpolation points and resulting address sub-segment vectors. Once split, the methodology of the embodiments of the present application explained above may be repeated for address sub-segment vectors.

In at least one embodiment, an application may benefit from storage of the address sub-segment vectors in the digital map application database, in place of the address segment vector, and in at least one embodiment, an application may benefit from storage of both the address sub-segment vectors and the address segment vector being stored in the digital map application database. Thus, the address sub-segment vectors may be stored in place of and/or in addition to the address segment vector. For example, the use of unsegmented address segment vector may be more efficient for display purposes or uses, while the segmented address sub-segment vectors may be more efficient for location/navigation purposes or uses. If memory constraints can permit the storage of both in the digital map application database, then it might be valuable, in at least one embodiment, to store both the new address sub-segment vectors and the address segment vector in the digital map application database so that each may be used to make the system more efficient.

It should also be noted that techniques other than the documented algorithm may be possible for determining how to apply known address point to address segment vectors in order to enhance segmenting thereof. Thus, the embodiments of the present application should not be limited by the algorithm expressed above. The application should only be limited by the claims set forth therein. The main idea of at least one embodiment of the present application is to enhance interpolation improvement by utilizing address segment vector splitting where improvements will occur.

Another embodiment of the present application is directed to a memory, storing unsegmented vectors and storing the address sub-segment vectors created by embodiments of the method explained above, in place of and/or in addition to corresponding address segment vectors, upon an address segment vector being segmented. In at least one embodiment, an application may benefit from a memory which stores the address sub-segment vectors in place of the address segment vector in the digital map application database, and in at least one embodiment, an application may benefit from a memory which stores both the address sub-segment vectors and the address segment vector in the digital map application database. For example, the unsegmented address segment vector may be more efficient for display purposes, while the segmented address sub-segment vectors may be more efficient for location/navigation purposes as discussed above. If memory constraints can permit both, then it might be valuable, in at least one embodiment, to store both the address sub-segment vectors and the address segment vector. Another embodiment of the present application is directed to a device, such as a navigation device for example, including such a memory.

Embodiments of the present invention involve changes to a digital map application database, whereas other vendors provide digital map application database-to-application converters and device application software that utilize the digital map application database or a derived compilation of that data. At least one embodiment is directed to Geographical Information Systems (GIS) based applications program for providing a user with information corresponding to a desired place, comprising: a map database (digital map application database) including a plurality of address segment vectors and a plurality of address sub-segment vectors, the plurality of the address sub-segment vectors being stored in the map database in place of a corresponding address segment vector upon a distance between a projection point, corresponding to a known address point projected onto the address segment vector, and an interpolation point, corresponding to an interpolated location of an address of the address point, exceeding a threshold distance.

Device application software access and manipulate the derived digital map application database in response to user inputs. The software's output to the user can be in a list, text, graphical display such as a map or video, audio such as speech, or other type of output. Many GIS, Internet and Navigation applications can use embodiments of the present invention discussed above. These applications include geocoding applications (text/list based), routing/directions applications (graphical/list/speech based) and graphical-based display applications. The applications can include navigation, Internet-based and Geographical Information Systems (GIS) among others. The application can be a mapping program, a navigation program or some other type of program. As discussed above, map application consumers have been provided with a variety of devices and systems to enable them to locate desired places. These devices and systems are in the form of in-vehicle navigation systems which enable a driver to navigate over streets and roads and to enter desired places, hand-held devices such as personal digital assistants ("PDAs") and cell phones that can do the same, and Internet applications in which users can access maps using or depicting the desired results. For purposes of this disclosure all such results are simply defined as "places."

Figure 11:
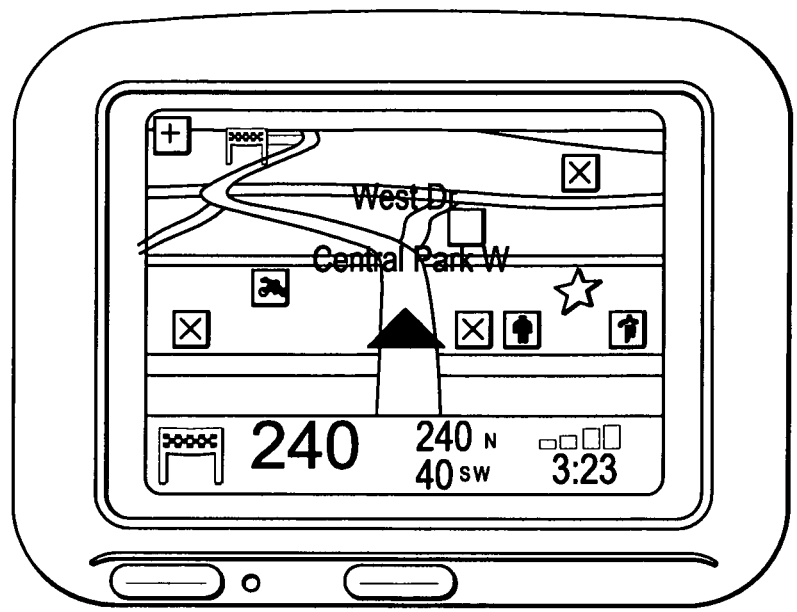
FIG. 11 illustrates an example embodiment as used on a hand-held device, such as personal navigation device (PND)

FIG. 11 illustrates an example embodiment as used on a portable hand-held device, such as personal digital assistant (PDA). The device could also be a cell phone, for example. On PDA map software, an example search may be performed by a user who wants driving directions to 150 Central Park West. The PDA map software utilizes embodiments of the present invention to accurately display the location of 150 Central Park West using the PDA map software.

Figure 12:
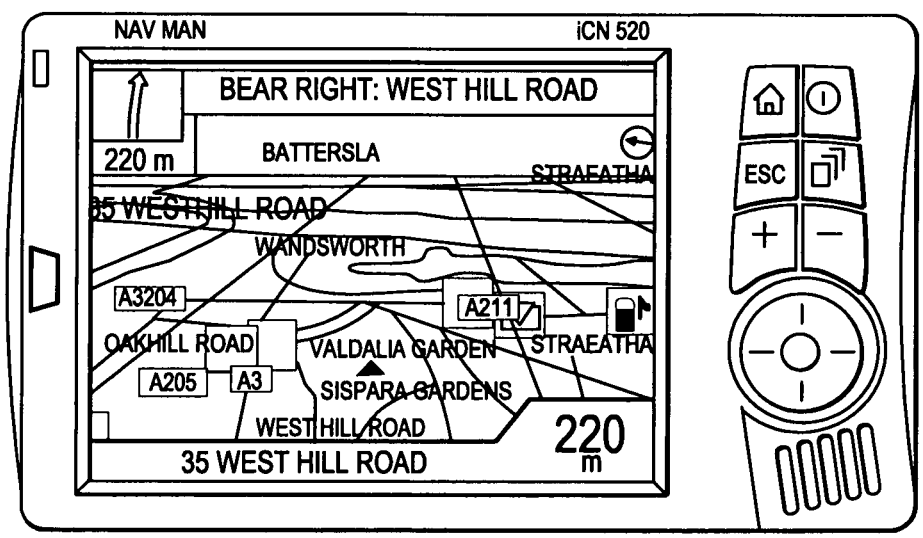
FIG. 12 illustrates an example embodiment as used on an in-vehicle navigation system, such as a global positioning system (GPS)

FIG. 12 illustrates an example embodiment of the method, database, memory, etc. as used on an in-vehicle navigation system, such as a global positioning system (GPS). On GPS map software, an example search may be performed by a driver who wants driving directions to 35 West Hill Road, as shown at the bottom of the GPS map software. The GPS map software utilizes embodiments of the present invention to accurately display the location of 35 West Hill Road, once the driver reaches his or her destination using the GPS software.

Figure 13:
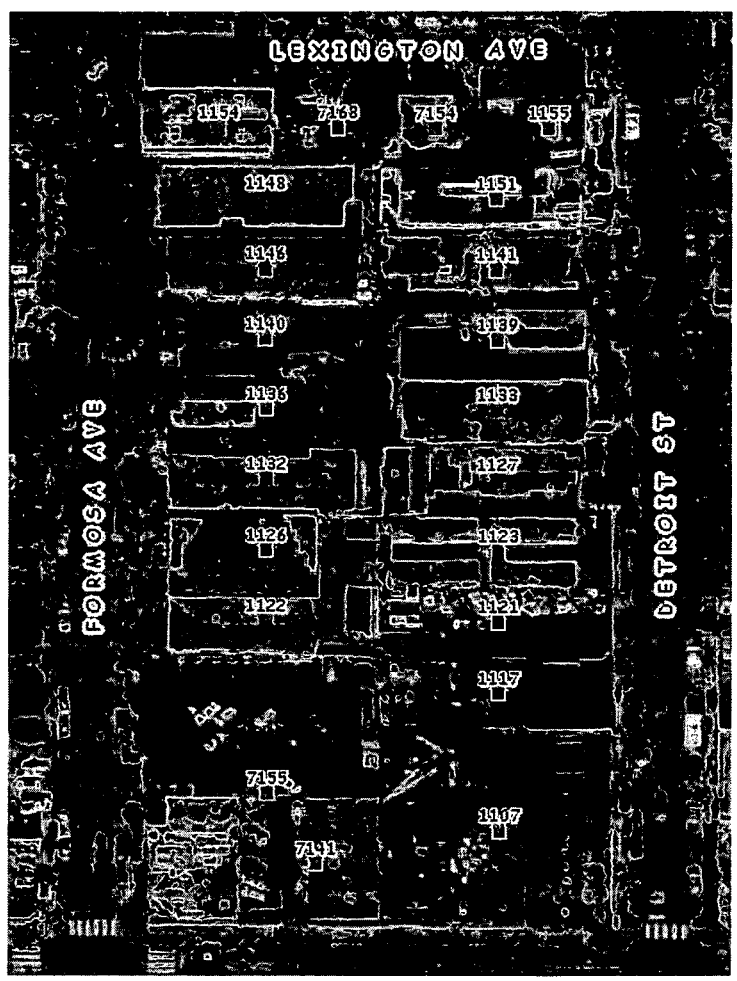
FIG. 13 illustrates an example embodiment of address points overlaid on an aerial photo.

FIG. 13 illustrates an example embodiment showing an example of address points overlaid on an aerial photo. In this example sub-segmenting might be necessary to give interpolated locations near the address points—it may depend on what the range is on the segment. For example, if the address range were 1101-1199, then the interpolated location of 1155 would be in the middle of the block instead of at the end, and sub-segmenting would improve the interpolation. But if the range on that piece of Detroit St was 1107-1155, sub-segmenting would not be necessary except for very high accuracy applications, in which case sub-segmenting could be applied to adjust for smaller non-linearities in the address distribution along the street segment.

Figure 14:
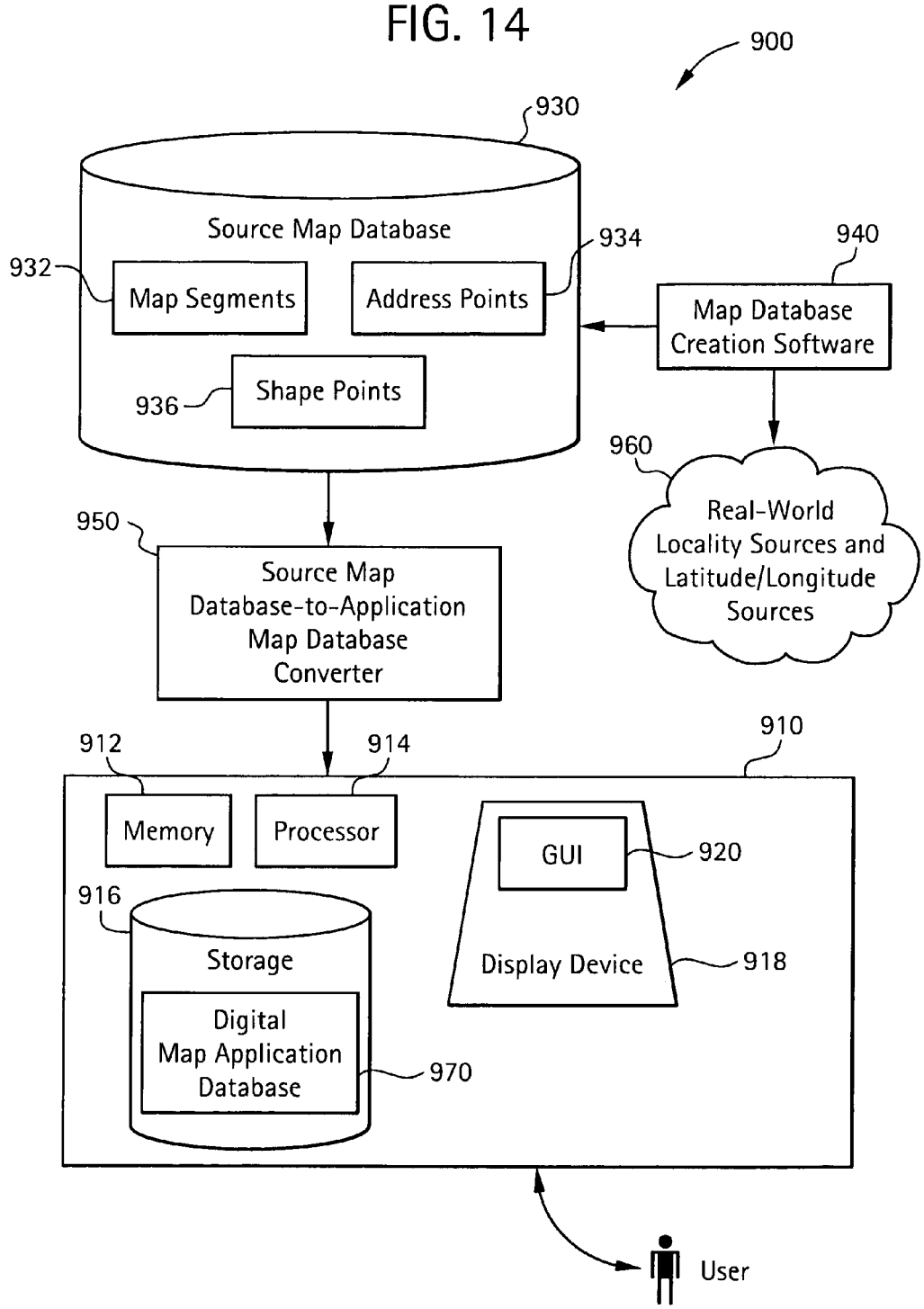
FIG. 14 illustrates that embodiments of the map database 504 are separate from a map database application 502.

Another embodiment of the present application is directed to a system 900 of FIG. 14 for providing a user with information corresponding to a desired location, comprising: a source map database 930 including a plurality of address segment vectors and a plurality of address sub-segment vectors, the plurality of the address sub-segment vectors being stored in the digital map application database in place of (and/or in addition to) a corresponding address segment vector upon a distance between a projection point, corresponding to a known address point projected onto the address segment vector, and an interpolation point, corresponding to an interpolated location of an address of the address point, exceeding a threshold distance; and a processor or computing device 910, to retrieve, using an applications program, at least one address point within the address range corresponding to an address segment vector or address sub-segment vector of the digital map application database, in response to a query regarding the desired location. An example system 900 is discussed below.

FIG. 14 shows a block diagram of an example system 900 that can be used with embodiments of the invention. Although this diagram depicts components as logically separate, such depiction is merely for illustrative purposes. It will be apparent to those skilled in the art that the components portrayed in this figure can be combined or divided into separate software, firmware and/or hardware components. Furthermore, it will also be apparent to those skilled in the art that such components, regardless of how they are combined or divided, can execute on the same computing device/system or can be distributed among different computing devices/systems connected by one or more networks or other suitable communication means.

As shown in FIG. 14, the system 900 typically includes a computing device 910 which may comprise one or more memories 912, one or more processors 914, and one or more storage devices or repositories 916 of some sort, at least one of the devices 916 including a digital map application database 970. The computing device 910 may further include a display device 918, including a graphical user interface or GUI 920 operating thereon by which the system can display maps and other information to a user. The user uses the computing device to request, for example, that a locality be displayed on a map or that driving directions be displayed as a route on a map and/or as text directions.

A source map database 930 is shown as external storage to computing device or system 910, but the source map database 930 in some instances may be the same storage as storage 916. According to embodiments of the present invention, source map database 930 contains a map segments and sub-segment table and index 932, an address points table and index 934, and a shape points table and index 936.

Proprietary map database creation software 940 will use real-world locality sources and latitude/longitude sources 960 to create the map segments, address points and shape points tables and indices 932, 934 and 936, respectively, in the source map database 930. Information from the source map database 930 is used by a source map database-to-application map database converter 950, which is ultimately used by a user of the computing device 910. The source map database-to-application map database converter 950 is shown remote to the user's computing device 910. This conversion may be the result of the map vendor as well as the result of the application software provider. The resulting application digital application map database 970, is typically stored in device storage unit 916. This device application software 950 is also shown remote but may also reside on the user's computing device 910.

Thus, an embodiment of the present invention may be directed to a system 900 for providing a user with information corresponding to a desired location, comprising: a digital application map database 970 including a plurality of address segment vectors and a plurality of address sub-segment vectors, the plurality of the address sub-segment vectors being stored in the digital application map database (970) at least one of in place of and in addition to a corresponding address segment vector upon a distance between a projection point, corresponding to a known address point projected onto the address segment vector, and a corresponding interpolation point, corresponding to an interpolated location of an address of the address point, exceeding a threshold distance. The application of the forgoing processing being applied to source map database 930 with the pertinent results being translated into digital application map database 970 through conversion process 950. Processor 914 retrieves digital application map database 970, and using an applications program, computes an interpolated location corresponding to an address segment vector or address sub-segment vector of the digital application map database, in response to a query regarding the desired location. The system may comprise an Internet-based system and/or an in-vehicle navigation system, for example. An embodiment of the present invention is directed to a device, such as a navigation device 200 for example. The navigation device may be a portable navigation device or an in-vehicle navigation device. The device of an embodiment of the present application may include a memory 230 (or memory resource) storing a digital application map database, the digital application map database including a plurality of address segment vectors and a plurality of address sub-segment vectors, the plurality of the address sub-segment vectors being stored in the application map database at least one of in place of and in addition to a corresponding address segment vector upon a distance between a projection point, corresponding to a known address point projected onto the address segment vector, and a corresponding interpolation point, corresponding to an interpolated location of an address of the address point, exceeding a threshold distance; and a display 240 to display a location of an input or selected address using the stored application map database. If the device is a navigation device 200, the navigation device 200 may further include an input device (220) to prompt input or selection of a travel destination; and a processor (210) to calculate a travel route to the input or selected travel destination, wherein the travel route calculation utilizes the stored application map database and wherein the display is useable to display the calculated travel route.

At least one embodiment of the present application may be directed to a navigation device 200, comprising: an integrated input and display device, including input device 220 and a display screen 240 discussed below for example, to prompt input or selection of a travel destination; a memory 230 (or memory resource) storing a map database (digital map application database), the map database including a plurality of address segment vectors and a plurality of address sub-segment vectors, the plurality of the address sub-segment vectors being stored in the digital application map database in place of a corresponding address segment vector upon a distance between a projection point, corresponding to a known address point projected onto the address segment vector, and a corresponding interpolated location of an address corresponding to the address point, exceeding a threshold distance; and a processor 210 to calculate a travel route to the input or selected travel destination, wherein the travel route calculation utilizes the stored application map database. A non-limiting example embodiment of such a navigation device 200 will be explained as follows.

Figure 15:
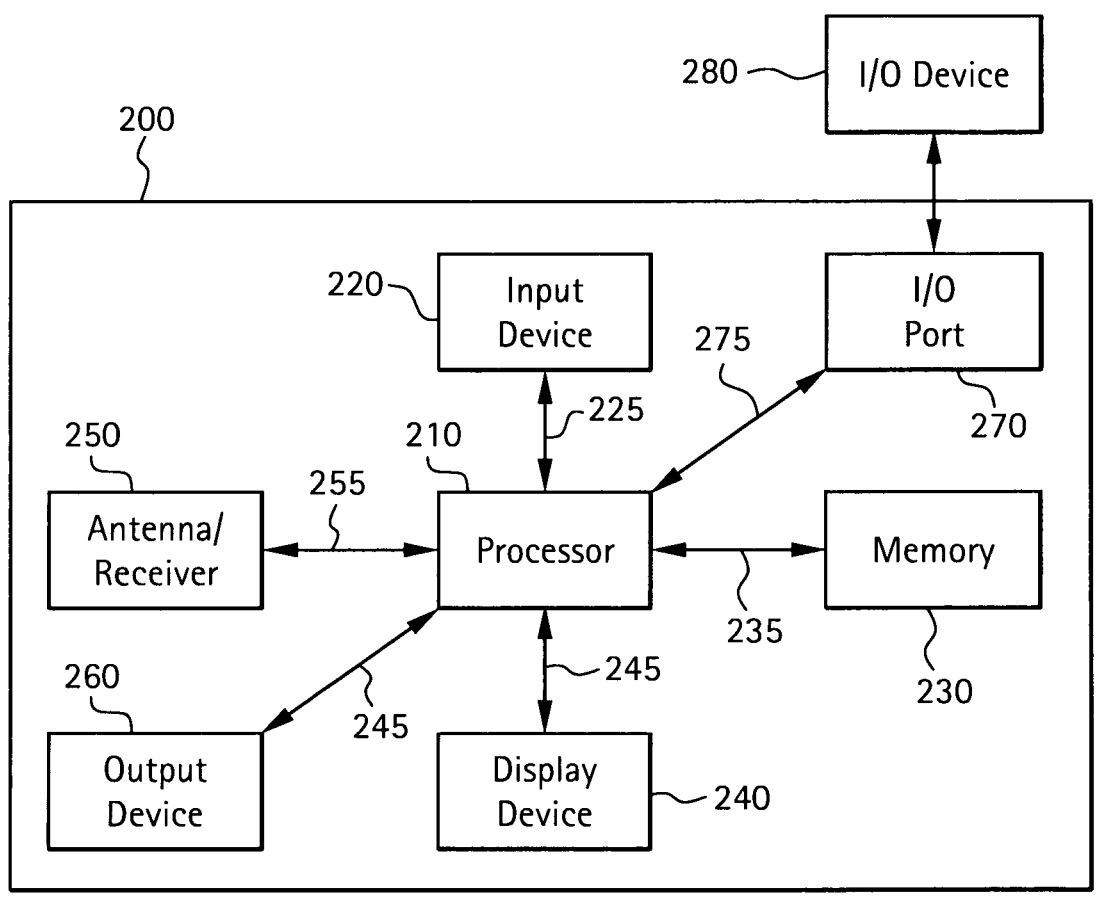
FIG. 15 illustrates electronic components arranged to provide a navigation device of an example embodiment of the present application.

FIG. 15 is an illustrative representation of electronic components of a navigation device 200 according to an example embodiment of the present invention (providing more detail than that of FIGS. 11 and 12, noting that an in-vehicle navigation device of FIG. 12 may include more memory than a portable navigation device of FIG. 11), in block component format. It should be noted that the block diagram of the navigation device 200 is not inclusive of all components of the navigation device, but is only representative of many example components.

The navigation device 200 is located within a housing (not shown). The housing includes a processor 210 connected to an input device 220 and a display screen 240. The input device 220 can include but is not limited to a keyboard device, voice input device, touch panel and/or any other known input device utilized to input information; and the display screen 240 can include any type of display screen such as an LCD display, for example. In a particular example arrangement the input device 220 and display screen 240 are integrated into an integrated input and display device, including a touchpad or touchscreen input so that a user need only touch a portion of the display screen 240 to select one of a plurality of display choices or to activate one of a plurality of virtual buttons.

The navigation device 200 may include an output device 260, for example an audible output device (e.g. a loudspeaker), a text output device, etc. As output device 260 can produce audible information for a user of the navigation device 200, it is should equally be understood that input device 220 can include a microphone and software for receiving input voice commands as well.

In the navigation device 200, processor 210 is operatively connected to and set to receive input information from input device 220 via a connection 225, and operatively connected to at least one of display screen 240 and output device 260, via output connections 245, to output information thereto. Further, the processor 210 is operably coupled to a memory resource 230 via connection 235 and is further adapted to receive/send information from/to input/output (I/O) ports 270 via connection 275, wherein the I/O port 270 is connectible to an I/O device 280 external to the navigation device 200. The memory resource 230 may stored a digital map application database (or even, in at least one instance of one example embodiment wherein the navigation device 200 has enough memory storage capacity and performs the method of FIG. 7 for example, a source database) as discussed in any of the embodiments of the present invention discussed above and comprises, for example, a volatile memory, such as a Random Access Memory (RAM) and a non-volatile memory, for example a digital memory, such as a flash memory. The external I/O device 280 may include, but is not limited to an external listening device such as an earpiece for example. The connection to I/O device 280 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the navigation device 200 and the internet or any other network for example, and/or to establish a connection to a server via the internet or some other network for example.

FIG. 15 further illustrates an operative connection between the processor 210 and an antenna/receiver 250 via connection 255, wherein the antenna/receiver 250 can be a GPS antenna/receiver for example. It will be understood that the antenna and receiver designated by reference numeral 250 are combined schematically for illustration, but that the antenna and receiver may be separately located components, and that the antenna may be a GPS patch antenna or helical antenna for example.

Further, it will be understood by one of ordinary skill in the art that the electronic components shown in FIG. 15 are powered by power sources (not shown) in a conventional manner. As will be understood by one of ordinary skill in the art, different configurations of the components shown in FIG. 15 are considered to be within the scope of the present application. For example, the components shown in FIG. 15 may be in communication with one another via wired and/or wireless connections and the like. Thus, the scope of the navigation device 200 of the present application includes a portable or handheld navigation device 200 and/or includes an in-vehicle navigation device.

In addition, the portable or handheld navigation device 200 of FIG. 15 can be connected or "docked" in a known manner to a vehicle such as a bicycle, a motorbike, a car or a boat for example. Such a navigation device 200 is then removable from the docked location for portable or handheld navigation use.

Further, in at least one embodiment, not only can the navigation device 200 store the newly created digital map application database including address sub-segment vectors (created by the method of FIG. 6 for example) in memory 230, but the navigation device 200 can perform operations of embodiments of the method of FIG. 7 described above using processor 210 of the navigation device 200 itself when storing a digital map source database or other database including known address points as discussed above). For example, the method of FIG. 7 can be performed, in at least one alternative embodiment, by processor 210 within navigation device 200, with the newly created digital map application database, created from the digital map source database including address sub-segment vectors, being thereafter stored in memory 230.

Figure 16:
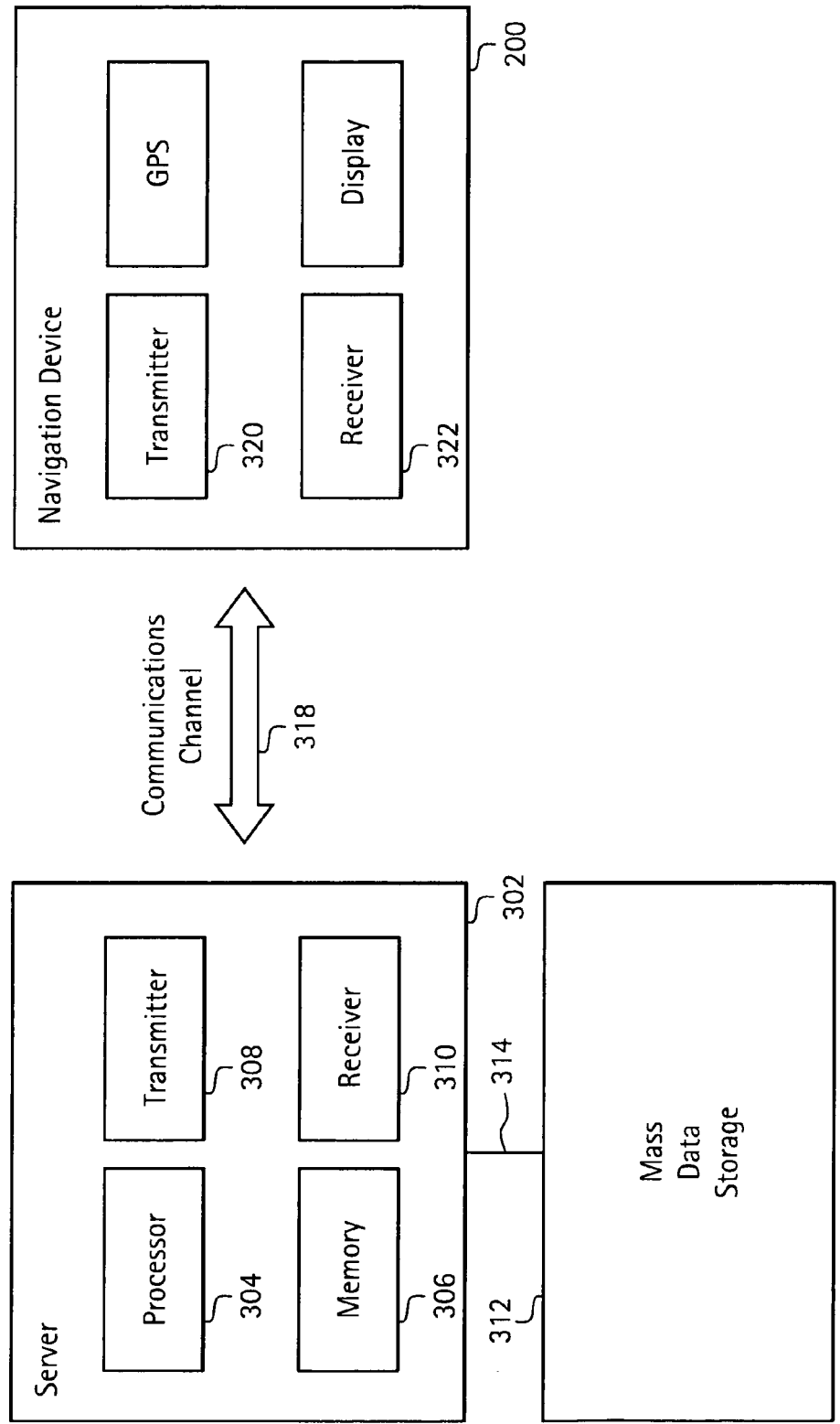
FIG. 16 illustrates an example embodiment where a navigation device may receive information over a wireless communication channel.

Referring now to FIG. 16, the navigation device 200 may establish a "mobile" or telecommunications network connection with a server 302 via a mobile device (not shown) (such as a mobile phone, PDA, and/or any device with mobile phone technology) establishing a digital connection (such as a digital connection via known Bluetooth technology for example). Thereafter, through its network service provider, the mobile device can establish a network connection (through the internet for example) with a server 302. As such, a "mobile" network connection may be established between the navigation device 200 (which can be, and often times is mobile as it travels alone and/or in a vehicle) and the server 302 to provide a "real-time" or at least very "up to date" gateway for information. As such, the navigation device 200 can receive and later store in memory 230, a newly created digital map database including address sub-segment vectors, created by the embodiments of the method described above, with regard to FIG. 6 for example.

The establishing of the network connection between the mobile device (via a service provider) and another device such as the server 302, using an internet (such as the World Wide Web) for example, can be done in a known manner. This can include use of TCP/IP layered protocol for example. The mobile device can utilize any number of communication standards such as CDMA, GSM, WAN, etc. As such, the navigation device 200 can receive and later store in memory 230, a newly created digital map database including address sub-segment vectors, created by the embodiments of the method described above, with regard to FIG. 6 for example.

As such, an internet connection may be utilized which is achieved via data connection, via a mobile phone or mobile phone technology within the navigation device 200 for example. For this connection, an internet connection between the server 302 and the navigation device 200 is established. This can be done, for example, through a mobile phone or other mobile device and a GPRS (General Packet Radio Service)-connection (GPRS connection is a high-speed data connection for mobile devices provided by telecom operators; GPRS is a method to connect to the internet).

The navigation device 200 can further complete a data connection with the mobile device, and eventually with the internet and server 302, via existing Bluetooth technology for example, in a known manner, wherein the data protocol can utilize any number of standards, such as the GSRM, the Data Protocol Standard for the GSM standard, for example. As such, the navigation device 200 can receive and later store in memory 230, a newly created digital map database including address sub-segment vectors, created by the embodiments of the method described above, with regard to FIG. 6 for example.

The navigation device 200 may include its own mobile phone technology within the navigation device 200 itself (including an antenna for example, or optionally using the internal antenna of the navigation device 200). The mobile phone technology within the navigation device 200 can include internal components as specified above, and/or can include an insertable card (e.g. Subscriber Identity Module or SIM card), complete with necessary mobile phone technology and/or an antenna for example. As such, mobile phone technology within the navigation device 200 can similarly establish a network connection between the navigation device 200 and the server 302, via the internet for example, in a manner similar to that of any mobile device. As such, the navigation device 200 can receive and later store in memory 230, a newly created digital map database including address sub-segment vectors, created by the embodiments of the method described above, with regard to FIG. 6 for example.

For GRPS phone settings, a Bluetooth enabled navigation device may be used to correctly work with the ever changing spectrum of mobile phone models, manufacturers, etc., model/manufacturer specific settings may be stored on the navigation device 200 for example. The data stored for this information can be updated.

In FIG. 16 the navigation device 200 is depicted as being in communication with the server 302 via a generic communications channel 318 that can be implemented by any of a number of different arrangements. The server 302 and a navigation device 200 can communicate when a connection via communications channel 318 is established between the server 302 and the navigation device 200 (noting that such a connection can be a data connection via mobile device, a direct connection via personal computer via the interne, etc.). As such, the navigation device 200 can receive and later store in memory 230, a newly created digital map database including address sub-segment vectors, created by the embodiments of the method described above, with regard to FIG. 6 for example.

The server 302 includes, in addition to other components which may not be illustrated, a processor 304 operatively connected to a memory 306 and further operatively connected, via a wired or wireless connection 314, to a mass data storage device 312. The processor 304 is further operatively connected to transmitter 308 and receiver 310, to transmit and send information to and from navigation device 200 via communications channel 318. The signals sent and received may include data, communication, and/or other propagated signals. The transmitter 308 and receiver 310 may be selected or designed according to the communications requirement and communication technology used in the communication design for the navigation system 200. Further, it should be noted that the functions of transmitter 308 and receiver 310 may be combined into a signal transceiver.

Server 302 is further connected to (or includes) a mass storage device 312, noting that the mass storage device 312 may be coupled to the server 302 via communication link 314. The mass storage device 312 contains a store of navigation data and map information, and can again be a separate device from the server 302 or can be incorporated into the server 302.

The navigation device 200 is adapted to communicate with the server 302 through communications channel 318, and includes processor 210, memory 230, etc. as previously described with regard to FIG. 15, as well as transmitter 320 and receiver 322 to send and receive signals and/or data through the communications channel 318, noting that these devices can further be used to communicate with devices other than server 302. Further, the transmitter 320 and receiver 322 are selected or designed according to communication requirements and communication technology used in the communication design for the navigation device 200 and the functions of the transmitter 320 and receiver 322 may be combined into a single transceiver. As such, the navigation device 200 can receive and later store in memory 230, a newly created digital map database including address sub-segment vectors, created by the embodiments of the method described above, with regard to FIG. 6 for example.

Software stored in server memory 306 provides instructions for the processor 304 and allows the server 302 to provide services to the navigation device 200. One service provided by the server 302 involves processing requests from the navigation device 200 and transmitting navigation data from the mass data storage 312 to the navigation device 200. Another service provided by the server 302 includes processing the navigation data using various algorithms for a desired application and sending the results of these calculations to the navigation device 200.

The communication channel 318 generically represents the propagating medium or path that connects the navigation device 200 and the server 302. Both the server 302 and navigation device 200 include a transmitter for transmitting data through the communication channel and a receiver for receiving data that has been transmitted through the communication channel.

The communication channel 318 is not limited to a particular communication technology. Additionally, the communication channel 318 is not limited to a single communication technology; that is, the channel 318 may include several communication links that use a variety of technology. For example, the communication channel 318 can be adapted to provide a path for electrical, optical, and/or electromagnetic communications, etc. As such, the communication channel 318 includes, but is not limited to, one or a combination of the following: electric circuits, electrical conductors such as wires and coaxial cables, fiber optic cables, converters, radio-frequency (RF) waves, the atmosphere, empty space, etc. Furthermore, the communication channel 318 can include intermediate devices such as routers, repeaters, buffers, transmitters, and receivers, for example.

In one illustrative arrangement, the communication channel 318 includes telephone and computer networks. Furthermore, the communication channel 318 may be capable of accommodating wireless communication such as radio frequency, microwave frequency, infrared communication, etc. Additionally, the communication channel 318 can accommodate satellite communication.

The communication signals transmitted through the communication channel 318 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 318. These signals may be modulated, encrypted and/or compressed signals as may be desirable for the communication technology.

The server 302 includes a remote server accessible by the navigation device 200 via a wireless channel. The server 302 may include a network server located on a local area network (LAN), wide area network (WAN), virtual private network (VPN), etc.

The server 302 may include a personal computer such as a desktop or laptop computer, and the communication channel 318 may be a cable connected between the personal computer and the navigation device 200. Alternatively, a personal computer may be connected between the navigation device 200 and the server 302 to establish an internet connection between the server 302 and the navigation device 200. Alternatively, a mobile telephone or other handheld device may establish a wireless connection to the internet, for connecting the navigation device 200 to the server 302 via the internet. As such, the navigation device 200 can receive and later store in memory 230, a newly created digital map database including address sub-segment vectors, created by the embodiments of the method described above, with regard to FIG. 6 for example.

The navigation device 200 may be provided with information (such as map database information in the form of a digital map application database for example, generated from the digital map source database created from a method of an embodiment of the present application discussed above (such as the method of FIG. 7 for example) from the server 302 via information downloads which may be periodically updated automatically (such as map or map database information for example) or upon a user connecting navigation device 200 to the server 302 and/or may be more dynamic upon a more constant or frequent connection being made between the server 302 and navigation device 200 via a wireless mobile connection device and TCP/IP connection for example. For many dynamic calculations, the processor 304 in the server 302 may be used to handle the bulk of the processing needs, however, processor 210 of navigation device 200 can also handle much processing and calculation, oftentimes independent of a connection to a server 302. As previously indicated, the digital map source database including address sub-segment vectors, may be created, by the embodiments of the method described above such as those described with regard to FIG. 6 for example, in the server 302 or even, in at least one embodiment, within the navigation device 200 itself (assuming the digital map database stored in the navigation device includes known address points). Again, as would be understood by one of ordinary skill in the art, any of the techniques of embodiments of the methods of the present application described above, are equally applicable to the digital map database of the device or navigation device 200 discussed herein.

As indicated above in FIG. 15, a navigation device 200 includes a processor 210, an input device 220, and a display screen 240. The input device 220 and display screen 240 are integrated into an integrated input and display device to enable both input of information (via direct input, menu selection, etc.) and display of information through a touch panel screen, for example. Such a screen may be a touch input LCD screen, for example, as is well known to those of ordinary skill in the art. Further, the navigation device 200 can also include any additional input device 220 and/or any additional output device, such as audio input/output devices for example.

Appropriate software coding can readily be prepared by skilled programmers based on the teachings of the present disclosure, as will be apparent to those skilled in the software art. Embodiments of the invention may also be implemented by the preparation of application specific integrated circuits or by interconnecting an appropriate network of conventional component circuits, as will be readily apparent to those skilled in the art.

Embodiments of the present invention include a computer program product which is a storage medium (media) having instructions stored thereon/in which can be used to program a computer to perform any of the processes of embodiments of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems, including molecular memory ICs, or any type of system or device suitable for storing instructions and/or data.

Embodiments of the present invention include a computer readable medium, comprising a map database, the map database including a plurality of address segment vectors and a plurality of address sub-segment vectors, the plurality of the address sub-segment vectors being stored in the map database at least one of in place of and in addition to a corresponding address segment vector upon a distance between a projection point, corresponding to a known address point projected onto the address segment vector, and a corresponding interpolation point, corresponding to an interpolated location of an address point, exceeding a threshold distance. Again, as would be understood by one of ordinary skill in the art, any of the techniques of embodiments of the methods of the present application described above, are equally applicable to the map database of the computer readable medium discussed herein.

At least one embodiment of the present application is directed to a digital map application database, storable on a storage medium (such as a computer readable medium or memory), comprising: a plurality of address segment vectors; and a plurality of address sub-segment vectors, the plurality of the address sub-segment vectors being stored in the digital map application database at least one of in place of and in addition to a corresponding address segment vector upon a distance between a projection point, corresponding to a known address point projected onto the address segment vector, and a corresponding interpolation point, corresponding to an interpolated location of an address of the address point, exceeding a threshold distance. Again, as would be understood by one of ordinary skill in the art, any of the techniques of embodiments of the methods of the present application described above, are equally applicable to the digital map application database discussed herein.

Stored on any one of the computer readable medium (media), embodiments of the present invention include software for controlling both the hardware of the general purpose/specialized computer or microprocessor, and for enabling the computer or microprocessor to interact with a human user or other mechanism utilizing the results of embodiments of the present invention. Such software may include, but is not limited to, device drivers, operating systems, and user applications. Ultimately, such computer readable media further includes software for performing embodiments of the present invention, as described above.

Included in the programming or software of the general/specialized computer or microprocessor are software modules for implementing the teachings of the embodiments of present invention. Embodiments of the present invention may be conveniently implemented using a conventional general purpose or a specialized digital computer or microprocessor programmed according to the teachings of the present disclosure, as will be apparent to those skilled in the computer art.

The foregoing description of the embodiments of the present invention has been provided for the purposes of illustration and description. It is not intended to be exhaustive or to limit embodiments of the invention to the precise forms disclosed. Many modifications and variations will be apparent to a practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

It will also be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

For example, whilst the above-described destination view includes images representative of buildings surrounding the destination address, it will be appreciated a destination view that included a rendered image of only the destination address would still help the user to identify and navigate to that address. Accordingly, whilst it is preferred to generate rendered images of the destination address and neighboring buildings, this is not an essential feature of the invention.

For example, whilst embodiments described in the foregoing detailed description refer to GPS, it should be noted that the navigation device may utilize any kind of position sensing technology as an alternative to (or indeed in addition to) GPS. For example the navigation device may utilize using other global navigation satellite systems such as the European Galileo system. Equally, it is not limited to satellite based but could readily function using ground based beacons or any other kind of system that enables the device to determine its geographic location.

It will also be well understood by persons of ordinary skill in the art that whilst the preferred embodiment implements certain functionality by means of software, that functionality could equally be implemented solely in hardware (for example by means of one or more ASICs (application specific integrated circuit)) or indeed by a mix of hardware and software. As such, the scope of the present invention should not be interpreted as being limited only to being implemented in software.

Lastly, it should also be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. An automated method, comprising:
projecting a plurality of known address points onto an address segment vector of a map database, to create projection points;
interpolating locations for addresses of the address points, to create corresponding interpolation points;
segmenting the address segment vector into a plurality of address sub-segment vectors, upon a distance between a projection point and a corresponding interpolation point exceeding a threshold distance; and
determining at least one of a relatively largest distance among distances between corresponding projection and interpolation points, and an average distance between all projection point and corresponding interpolation point pairs; wherein the segmenting is performed upon at least one of the determined relatively largest distance exceeding the threshold distance, and the determined average distance exceeding the threshold distance.

2. A memory, storing unsegmented address segment vectors and storing the address sub-segment vectors of the method of claim 1, at least one of in place of and in addition to corresponding address segment vectors, upon an address segment vector being segmented.

3. A navigation device including the memory of claim 2.

4. The method of claim 1, wherein the projecting, interpolating and determining are performed for multiple segmenting into address sub-segment vectors, until either:
an average distance between projection points and corresponding interpolation points within each of the address sub-segment vectors is less than the threshold distance, or
the relatively largest distance within each of the address sub-segment vectors is less than the threshold distance.

5. The method of claim 1, wherein the threshold distance is set so as to allow only a maximum or relatively largest number of interpolation addresses to fall between a projection point and a corresponding interpolation point pair.

6. The method of claim 1, wherein the threshold distance is a distance function.

7. The method of claim 1, further comprising:
storing the plurality of address sub-segment vectors in the map database, at least one of in place of and in addition to a corresponding address segment vector.

8. The method of claim 1, further comprising:
storing, upon the distance not exceeding the threshold distance for the address segment vector, the address segment vector without further segmenting.

9. The method of claim 1, further comprising:
storing, upon the determined relatively largest distance not exceeding the threshold distance for an address segment vector or address sub-segment vector, the address segment vector or address sub-segment vector without further segmenting.

10. The method of claim 4, further comprising:
storing, upon the determined average distance not exceeding the threshold distance for an address segment vector or address sub-segment vector, the address segment vector or address sub-segment vector without further segmenting.

11. The method of claim 1, wherein the threshold distance is adjustable for different conditions.

12. The method of claim 1, wherein the segmenting is performed at at least one point along the address segment vector or address sub-segment vector that reduces an average distance between all projection point and corresponding interpolation point pairs.

13. The method of claim 12, wherein the point is a projection point.

14. The method of claim 1, wherein an address segment vector corresponds to a street segment of one side of a street.

15. The method of claim 1, wherein an address segment vector corresponds to a street segment of both sides of a street.

16. The method of claim 1, wherein an address segment vector or address sub-segment vector is segmented at one of the projection points.

17. A non-transitory computer readable medium, comprising:
a map database, the map database including a plurality of address segment vectors and a plurality of address sub-segment vectors, the plurality of the address sub-segment vectors being stored in the map database at least one of in place of and in addition to a corresponding address segment vector upon a distance between a projection point, corresponding to a known address point projected onto the address segment vector, and a corresponding interpolation point, corresponding to an interpolated location of an address of the address point, exceeding a threshold distance,
wherein the plurality of sub-segment vectors are stored at least one of in place of and in addition to a corresponding address segment vector, upon at least one of:
a relatively largest distance, among distances between corresponding projection and interpolation points, exceeding the threshold distance; and
an average distance, determined between all projection point and corresponding interpolation point pairs, exceeding the threshold distance.

18. The non-transitory computer readable medium of claim 17, wherein the map database includes further segmented address sub-segment vectors being stored at least one of in place of and in addition to a corresponding address sub-segment vector, until the relatively largest distance does not exceed the threshold distance.

19. The non-transitory computer readable medium of claim 17, wherein the map database includes further segmented address sub-segment vectors being stored at least one of in place of and in addition to a corresponding address sub-segment vector, until an average distance between projection points and corresponding interpolation points of the address sub-segment vector is less than the threshold distance.

20. The non-transitory computer readable medium of claim 17, wherein the threshold distance is set so as to allow only a maximum or relatively largest number of interpolation addresses to fall between a projection point and a corresponding interpolation point pair.

21. A map database, storable on a storage medium, comprising:
a plurality of address segment vectors; and
a plurality of address sub-segment vectors, the plurality of the address sub-segment vectors being stored in the map database at least one of in place of and in addition to a corresponding address segment vector upon a distance between a projection point, corresponding to a known address point projected onto the address segment vector, and a corresponding interpolation point, corresponding to an interpolated location of an address of the address point, exceeding a threshold distance,
wherein the sub-segment vectors are stored at least one of in place of and in addition to a corresponding address segment vector, upon at least one of:
a relatively largest distance, among distances between corresponding projection and interpolation points, exceeding the threshold distance; and
an average distance, determined between all projection point and corresponding interpolation point pairs, exceeding the threshold distance.

22. The map database of claim 21, wherein the map database includes further segmented address sub-segment vectors being stored at least one of in place of and in addition to a corresponding address sub-segment vector, until the relatively largest distance does not exceed the threshold distance.

23. The map database of claim 21, wherein the map database includes further segmented address sub-segment vectors being stored at least one of in place of and in addition to a corresponding address sub-segment vector, until an average distance between projection points and corresponding interpolation points of the address sub-segment vector is less than the threshold distance.

24. The map database of claim 21, wherein the threshold distance is set so as to allow only a maximum or relatively largest number of interpolation addresses to fall between a projection point and a corresponding interpolation point pair.

25. A device, comprising:
a memory storing a map database, the map database including a plurality of address segment vectors and a plurality of address sub-segment vectors, the plurality of the address sub-segment vectors being stored in the map database at least one of in place of and in addition to a corresponding address segment vector upon a distance between a projection point, corresponding to a known address point projected onto the address segment vector, and a corresponding interpolation point, corresponding to an interpolated location of an address of the address point, exceeding a threshold distance; and
an output device to output a location of an input or selected address using the stored map database,
wherein the plurality of sub-segment vectors are stored at least one of in place of and in addition to a corresponding address segment vector, upon at least one of:

a relatively largest distance, among distances between corresponding projection and interpolation points, exceeding the threshold distance; and an average distance, determined between all projection point and corresponding interpolation point pairs, exceeding the threshold distance.

26. The device of claim 25, wherein the output device is at least one of a display, a text output device and an audible output device.

27. The device of claim 25, wherein the map database includes further segmented address sub-segment vectors being stored at least one of in place of and in addition to a corresponding address sub-segment vector, until the relatively largest distance does not exceed the threshold distance.

28. The device of claim 25, wherein the map database includes further segmented address sub-segment vectors being stored at least one of in place of and in addition to a corresponding address sub-segment vector, until an average distance between projection points and corresponding interpolation points of the address sub-segment vector is less than the threshold distance.

29. The device of claim 25, wherein the threshold distance is set so as to allow only a maximum or relatively largest number of interpolation addresses to fall between a projection point and a corresponding interpolation point pair.

30. The device of claim 25, wherein the device is a navigation device, the navigation device further comprising:
    an input device to prompt input or selection of a travel destination; and
    a processor to calculate a travel route to the input or selected travel destination, wherein the travel route calculation utilizes the stored map database and wherein the output device is useable to output the calculated travel route.

31. The navigation device of claim 30, wherein the navigation device is a portable navigation device.

32. The navigation device of claim 30, wherein the navigation device is an in-vehicle navigation device.

33. A system for providing a user with information corresponding to a desired location, comprising:
    a map database including a plurality of address segment vectors and a plurality of address sub-segment vectors, the plurality of the address sub-segment vectors being stored in the map database at least one of in place of and in addition to a corresponding address segment vector upon a distance between a projection point, corresponding to a known address point projected onto the address segment vector, and a corresponding interpolation point, corresponding to an interpolated location of an address of the address point, exceeding a threshold distance; and
    a processor, to retrieve, using an applications program, an interpolated location corresponding to an address segment vector or address sub-segment vector of the map database, in response to a query regarding the desired location,
    wherein the sub-segment vectors are stored at least one of in place of and in addition to a corresponding address segment vector, upon at least one of:
    a relatively largest distance, among distances between corresponding projection and interpolation points, exceeding the threshold distance; and
    an average distance, determined between all projection point and corresponding interpolation point pairs, exceeding the threshold distance.

34. A system according to claim 33, wherein the system comprises an Internet-based system.

35. A system according to claim 33, wherein the system comprises an in-vehicle navigation system.

36. A Geographical Information Systems (GIS) based applications program for providing a user with information corresponding to a desired place, comprising:
    a map database including a plurality of address segment vectors and a plurality of address sub-segment vectors, the plurality of the address sub-segment vectors being stored in the map database at least one of in place of and in addition to a corresponding address segment vector upon a distance between a projection point, corresponding to a known address point projected onto the address segment vector, and a corresponding interpolation point, corresponding to an interpolated location of an address of the address point, exceeding a threshold distance,
    wherein the plurality of sub-segment vectors are stored at least one of in place of and in addition to a corresponding address segment vector, upon at least one of:
    a relatively largest distance, among distances between corresponding projection and interpolation points, exceeding the threshold distance; and
    an average distance, determined between all projection point and corresponding interpolation point pairs, exceeding the threshold distance.

* * * * *